(12) United States Patent
Ström et al.

(10) Patent No.: US 10,674,182 B2
(45) Date of Patent: Jun. 2, 2020

(54) PIXEL PRE-PROCESSING AND ENCODING

(71) Applicant: TELEFONAKTIEBOLAGET LM ERICSSON (PUBL), Stockholm (SE)

(72) Inventors: Jacob Ström, Stockholm (SE); Kenneth Andersson, Gävle (SE); Martin Pettersson, Vallentuna (SE); Jonatan Samuelsson, Enskede (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 121 days.

(21) Appl. No.: 15/579,053

(22) PCT Filed: May 2, 2016

(86) PCT No.: PCT/SE2016/050383
§ 371 (c)(1),
(2) Date: Dec. 1, 2017

(87) PCT Pub. No.: WO2016/195567
PCT Pub. Date: Dec. 8, 2016

(65) Prior Publication Data
US 2019/0089988 A1 Mar. 21, 2019

Related U.S. Application Data

(60) Provisional application No. 62/171,747, filed on Jun. 5, 2015.

(51) Int. Cl.
*H04N 19/85* (2014.01)
*H04N 19/186* (2014.01)
(Continued)

(52) U.S. Cl.
CPC ............. *H04N 19/85* (2014.11); *H04N 19/12* (2014.11); *H04N 19/154* (2014.11); *H04N 19/186* (2014.11); *H04N 19/19* (2014.11)

(58) Field of Classification Search
None
See application file for complete search history.

(56) References Cited

U.S. PATENT DOCUMENTS

| 8,223,167 | B2 | 7/2012 | Ogino et al. |
| 9,100,530 | B2 | 8/2015 | Kitada et al. |
| | | (Continued) | |

FOREIGN PATENT DOCUMENTS

| CN | 102054424 A | 5/2011 |
| CN | 103391416 A | 11/2013 |
| | (Continued) | |

OTHER PUBLICATIONS

International Search Report and Written Opinion dated Oct. 7, 2016, in International Application No. PCT/SE2016/050383, 15 pages.
(Continued)

*Primary Examiner* — Michael J Hess
(74) *Attorney, Agent, or Firm* — Rothwell, Figg, Ernst & Manbeck, P.C.

(57) ABSTRACT

A pre-processing of a pixel in a picture comprises determining, based on a minimum color component value for the pixel, whether a default processing chain is used to derive a luma component value, a first subsampled chroma component value and a second subsampled chroma component value or whether an auxiliary processing chain is used to derive at least one of the luma component value, the first subsampled chroma component value and the second subsampled chroma component value. The pre-processing improves the visual quality of pictures but at a low cost with regard to extra processing time.

22 Claims, 14 Drawing Sheets

(51) Int. Cl.
 H04N 19/154 (2014.01)
 H04N 19/12 (2014.01)
 H04N 19/19 (2014.01)

(56) References Cited

U.S. PATENT DOCUMENTS

2003/0090455 A1    5/2003  Daly
2013/0300774 A1   11/2013  Liu et al.
2017/0054989 A1*   2/2017  Stessen .................... H04N 9/77

FOREIGN PATENT DOCUMENTS

EP    2804378 A1    11/2014
JP    2008185973 A   8/2008
WO    2014205363 A1  12/2014

OTHER PUBLICATIONS

Ajay Luthra et al., "Test sequences and anchor generation for HDR and Wide Gamut Content Distribution" International Organisation for Standardisation Organisation Internationale De Normalisation ISO/IEC JTC1/SC29/WG11, Coding of Moving Pictures and Audio, ISO/IEC JTCI1/SC29/WG11 MPEG2014/N14548, 2014, 14 pages.
E. Francois et al., "About using a BT.2020 container for BT.709 content" International Organisation for Standardisation Organisation Internationale De Normalisation ISO/IEC JTC1/SC29/WG11, Coding of Moving Pictures and Audio, ISO/IEC JTC1/SC29/WG11 MPEG2013/M35255, 2014, 16 pages.
Thoma Herbert et al., "Chroma Subsampling for HDR Video with Improved Subjective Quality" 2013 IEEE, Picture Coding Symposium (PCS), pp. 345-348.
Jacob Strom et al., "Ericsson's response to CfE for HDR and WCG" International Organisation for Standardisation Organisation Internationale De Normalisation ISO/IEC JTC1/SC29/WG11, Coding of Moving Pictures and Audio, ISO/IEC JTCI1/SC29/WG11 MPEG2014/M36184, 2015, 11 pages.
Jacob Strom, "Investigation of HDR Color Subsampling", International Organisation for Standardisation Organisation Internationale De Normalisation ISO/IEC JTC1/SC29/WG11 Coding of Moving Pictures and Audio, ISO/JTC1/SC29/WG11, MPEG2014/M35841, 2015, 7 pages.
Ajay Luthra et al., "Call for Evidence (CfE) for HDR and WCG Video Coding", International Organisation for Standardisation Organisation Internationale De Normalisation ISO/IEC JTC1/SC29/WG11 Coding of Moving Pictures and Audio, ISO/JTC1/SC29/WG11, MPEG2014/N15083, 2015, 46 pages.
Extended European Search Report dated Dec. 14, 2018, issued in European Patent Application No. 16803847.9, 8 pages.
E. Francois et al. "About using a BT.2020 container for BT.709 content" m35255, 110th MPEG meeting, Strasbourg, France, Oct. 2014, Technicolor, 14 pages.
Jacob Ström et al. "Luma Adjustment for High Dynamic Range Video" 2016 Data Compression Conference, IEEE, pp. 319-328.
James M Kasson et al. "An Analysis of Selected Computer Interchange Color Spaces" ACM Transactions on Graphics, vol. 11, No. 4, Oct. 1992, pp. 373-405.
First Chinese Office Action dated Nov. 25, 2019, issued in Chinese Patent Application No. 2016800458534, 6 pages.

* cited by examiner

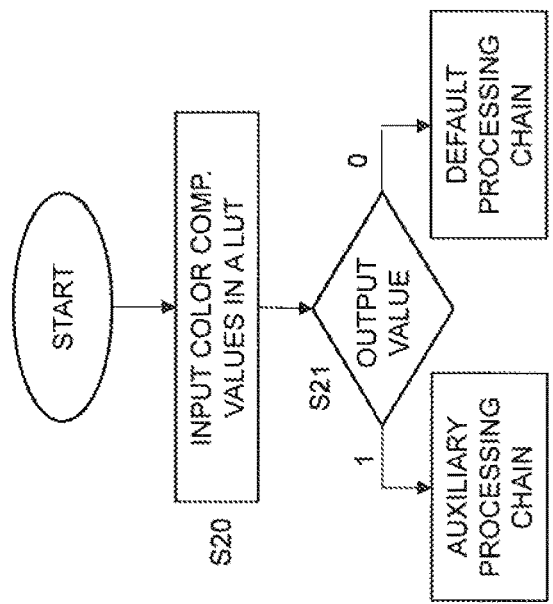
Fig. 3
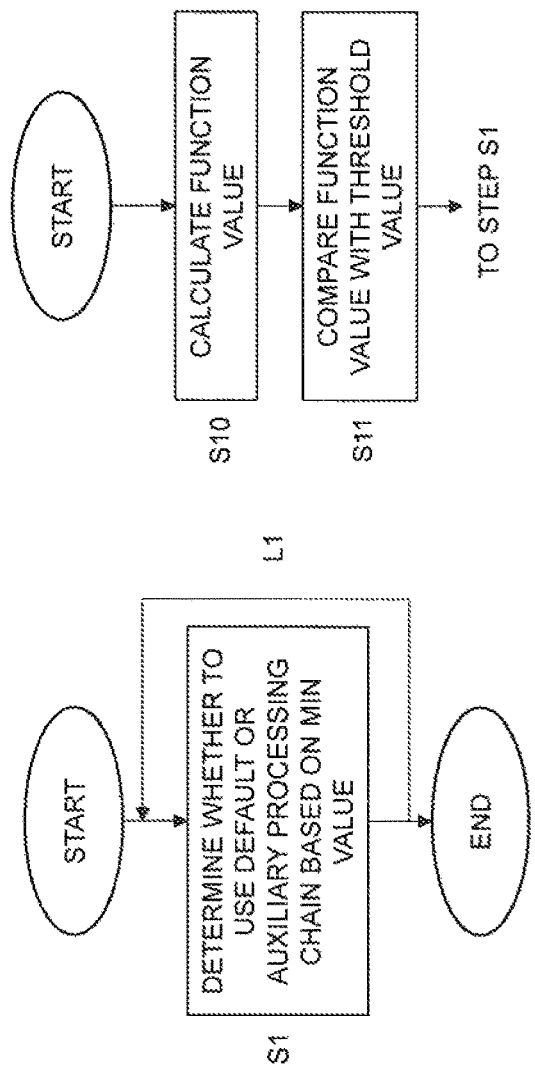
Fig. 2
Fig. 1

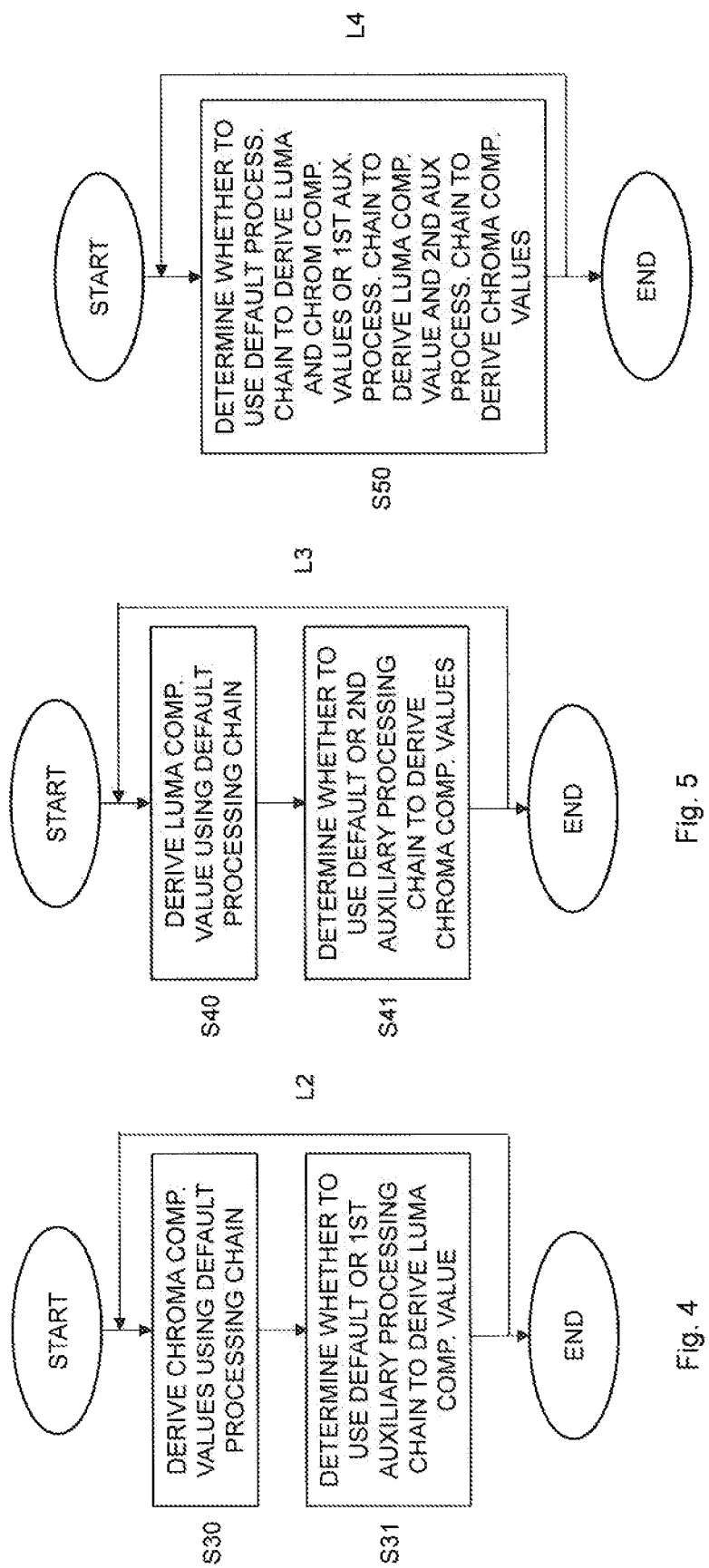

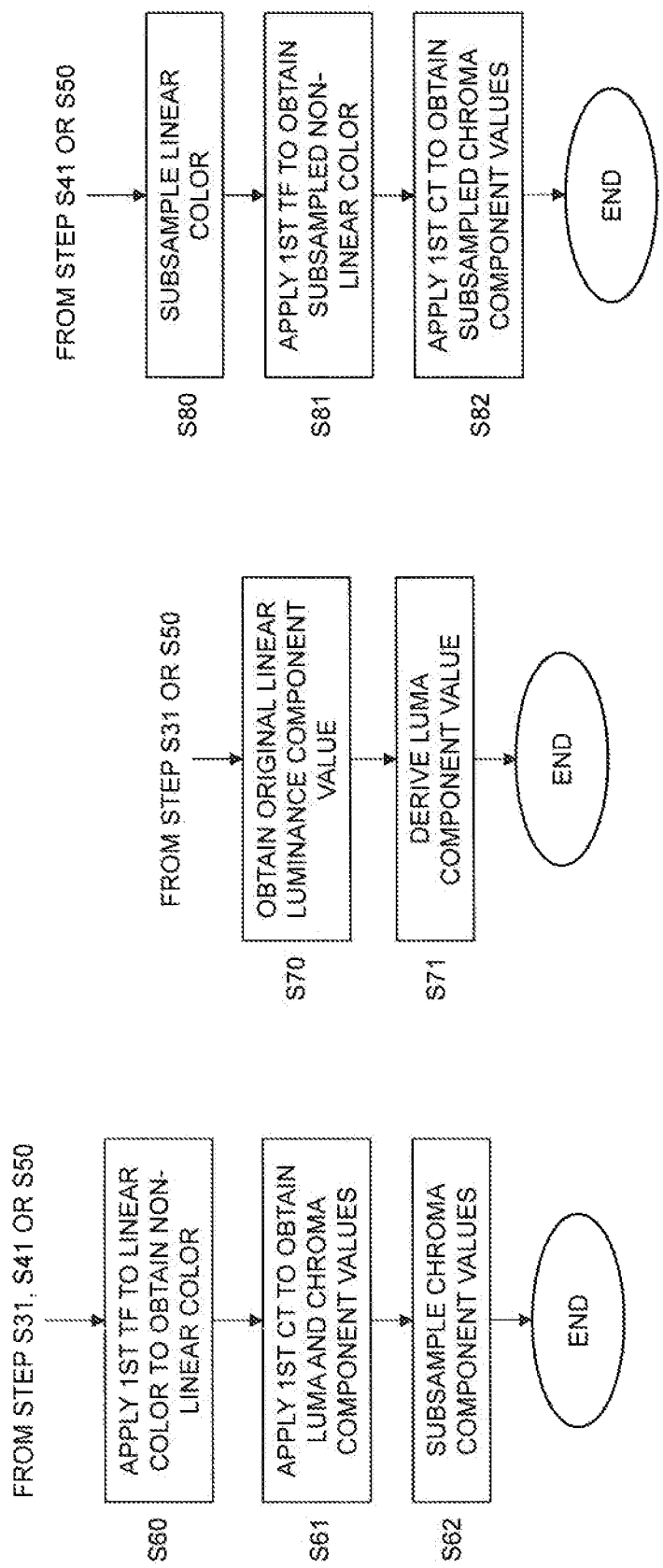

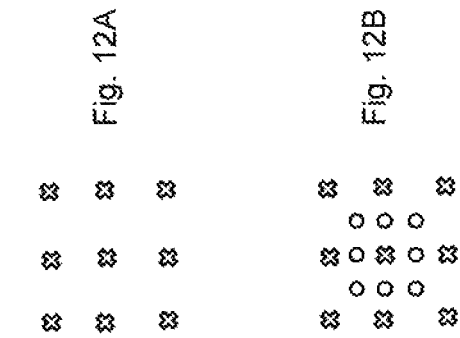
Fig. 12A
Fig. 12B
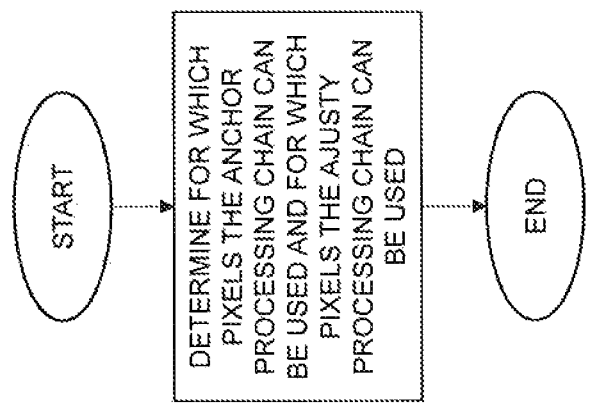
Fig. 11
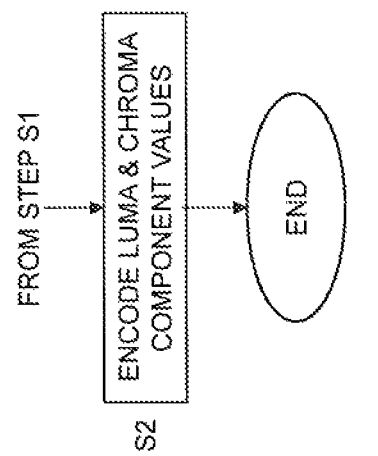
Fig. 10

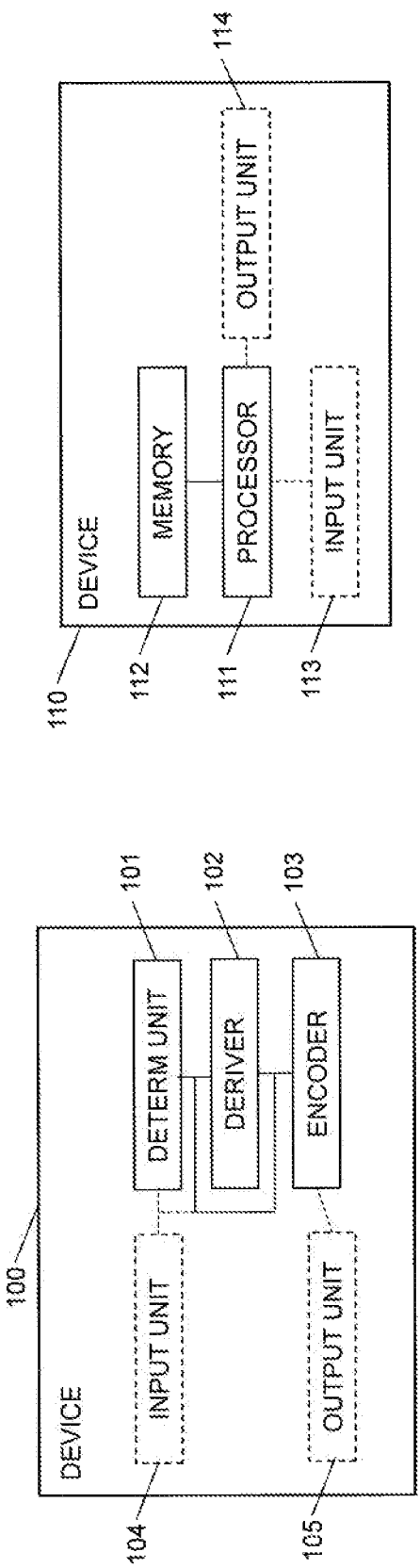

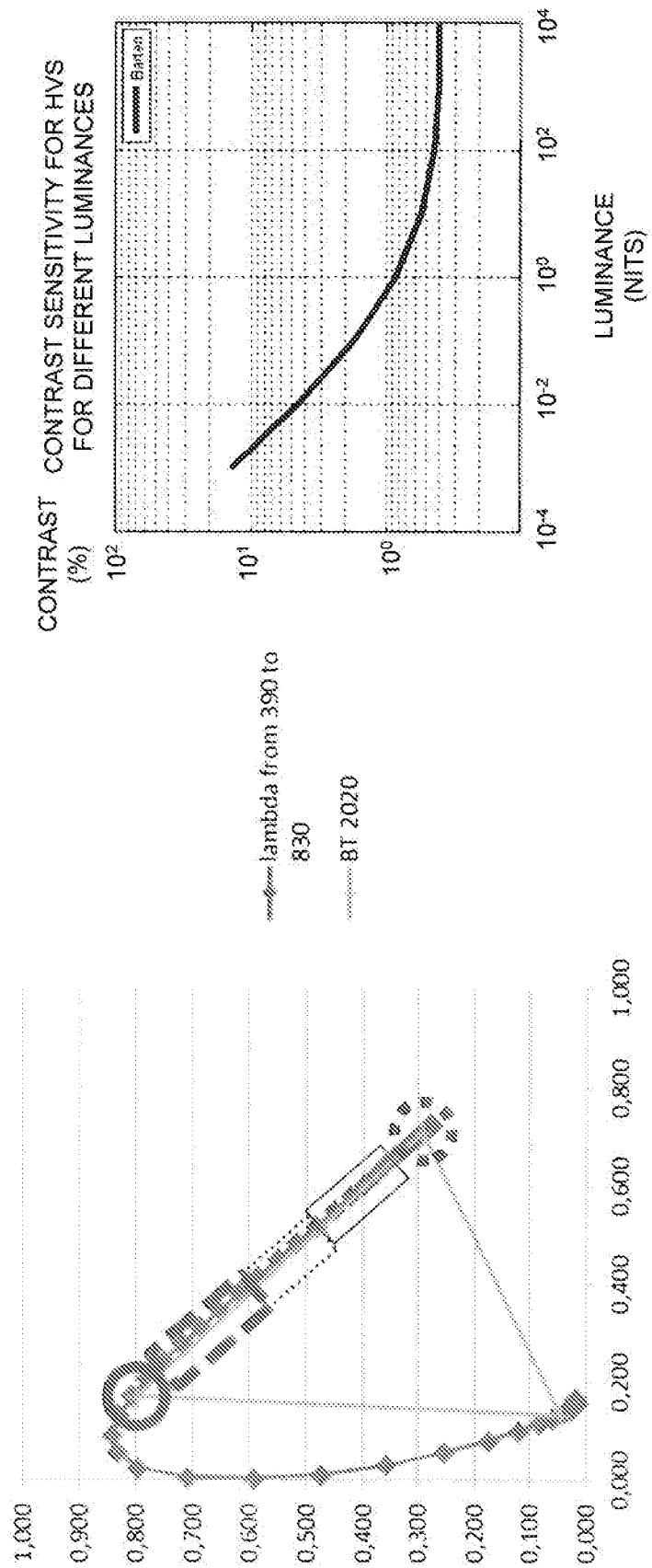

PIXEL PRE-PROCESSING AND ENCODING

CROSS REFERENCE TO RELATED APPLICATION(S)

This application is a 35 U.S.C. § 371 National Phase Entry Application from PCT/SE2016/050383, filed May 2, 2016, designating the United States, and also claims the benefit of U.S. Provisional Application No. 62/171,747, filed Jun. 5, 2015. The disclosures of both applications are incorporated herein in their entirety by reference.

TECHNICAL FIELD

The present embodiments generally relate to pre-processing and encoding of pixels in a picture, and in particular to such pre-processing and encoding that improves luminance and/or chrominance values of pixels in a computational efficient way.

BACKGROUND

A combination of a highly non-linear transfer function, 4:2:0 subsampling and non-constant luminance ordering gives rise to severe artifacts in saturated colors in pictures of a video sequence. A non-linear transfer function converts linear samples to non-linear samples with the purpose to mimic human vision.

A simple example of a non-linear transfer function is $x^{(1/gamma)}$, where gamma is 2.2. An example of another transfer function is the one used in Society of Motion Picture & Television Engineers (SMPTE) specification ST 2084 [1]. Before display the inverse of the non-linear transfer function is typically used, but it is also possible to use a function that is not the inverse of the non-linear transfer function. In the gamma example $x^{gamma}$ can be used to go back to linear samples.

One example is the way to carry out conversion from RGB 4:4:4 to Y'CbCr 4:2:0 that is described in [2], which we will refer to as the "anchor" way of processing in this document. RGB 4:4:4 is the color format typically used by cameras to capture video and by displays to present the video. To compress the video with less perceptual artifacts, RGB 4:4:4 is typically converted to Y'CbCr 4:2:0 before compression. In this case, RGB 4:4:4 is transferred by a non-linear transfer function to R'G'B' 4:4:4 which then is converted to Y'CbCr 4:4:4 by a linear color transform. Finally, the chroma samples Cb and Cr are subsampled, by a factor two in both vertical and horizontal directions, to quarter resolution resulting in Y'CbCr 4:2:0. As described in Annex B, the anchor way of processing gives rise to situations where changes between two colors of similar luminance can result in a reconstructed picture or image with very different luminances.

SUMMARY

It is a general objective to provide a pre-processing of pixels to combat visual artifacts.

It is a particular objective to provide such a pre-processing that improves the quality but at a low cost with regard to extra processing time.

These and other objectives are met by embodiments as disclosed herein.

An aspect of the embodiments relates to a method of pre-processing a pixel in a picture. The method comprises determining, based on a minimum color component value for the pixel, whether a default processing chain is used to derive a luma component value, a first subsampled chroma component value and a second subsampled chroma component value or whether an auxiliary processing chain is used to derive at least one of the luma component value, the first subsampled chroma component value and the second subsampled chroma component value.

Another aspect of the embodiments relates to a device for pre-processing a pixel in a picture. The device is configured to determine, based on a minimum color component value for the pixel, whether a default processing chain is used to derive a luma component value, a first subsampled chroma component value and a second subsampled chroma component value or whether an auxiliary processing chain is used to derive at least one of the luma component value, the first subsampled chroma component value and the second subsampled chroma component value.

A further aspect of the embodiments relates to a device for pre-processing a pixel in a picture. The device comprises a determining unit for determining, based on a minimum color component value for the pixel, whether a default processing chain is used to derive a luma component value, a first subsampled chroma component value and a second subsampled chroma component value or whether an auxiliary processing chain is used to derive at least one of the luma component value, the first subsampled chroma component value and the second subsampled chroma component value. The device also comprises a deriver for deriving the luma component value, the first subsampled chroma component value and the second subsampled chroma component value according to default processing chain or the least one of the luma component value, the first subsampled chroma component value and the second subsampled chroma component value according to the auxiliary processing chain.

Yet another aspect of the embodiments relates to a device for encoding a pixel in a picture. The device comprises a processor and a memory comprising instructions executable by the processor. The processor is operative to determine, based on the minimum color component value, whether the default processing chain is used to derive the luma component value, the first subsampled chroma component value and the second chroma component value or whether the auxiliary processing chain is used to derive the at least one of the luma component value, the first subsampled chroma component value and the second subsampled chroma component value. The processor is also operative to derive the luma component value, the first subsampled chroma component value and the second subsampled chroma component value according to default processing chain or the least one of the luma component value, the first subsampled chroma component value and the second subsampled chroma component value according to the auxiliary processing chain. The processor is further operative to encode the luma component value, the first subsampled chroma component value and the second chroma component value.

A further aspect of the embodiments relates to a device for encoding a pixel in a picture. The device comprises a determining unit for determining, based on the minimum color component value, whether the default processing chain is used to derive the luma component value, the first subsampled chroma component value and the second chroma component value or whether the auxiliary processing chain is used to derive the at least one of the luma component value, the first subsampled chroma component value and the second subsampled chroma component value. The device also comprises a deriver for deriving the luma component value, the first subsampled chroma component value and the second subsampled chroma component value according to default processing chain or the least one of the luma component value, the first subsampled chroma component value and the second subsampled chroma component value according to the auxiliary processing chain. The device further comprises an encoder for encoding the luma component value, the first subsampled chroma component value and the second chroma component value.

Another aspect of the embodiments relates to a computer program comprising instructions, which when executed by a processor, cause the processor to determine, based on a minimum color component value for a pixel in a picture, whether a default processing chain is used to derive a luma component value, a first subsampled chroma component value and a second subsampled chroma component value or whether an auxiliary processing chain is used to derive at least one of the luma component value, the first subsampled chroma component value and the second subsampled chroma component value.

A related aspect of the embodiments defines a carrier comprising a computer program according to above. The carrier is one of an electric signal, an optical signal, an electromagnetic signal, a magnetic signal, an electric signal, a radio signal, a microwave signal, or a computer-readable storage medium.

The present embodiments provide a pixel pre-processing and encoding that combats artifacts that otherwise may occur due to usage of a non-linear transfer function in combination with chroma subsampling. The quality improvement in luminance and/or chrominance is achieved at a low cost with regard to processing time.

BRIEF DESCRIPTION OF THE DRAWINGS

The embodiments, together with further objects and advantages thereof, may best be understood by making reference to the following description taken together with the accompanying drawings, in which:

FIG. 1 is a flow chart illustrating a method of pre-processing a pixel in a picture according to an embodiment;

FIG. 2 is a flow chart illustrating additional, optional steps of the method shown in FIG. 1 according to an embodiment;

FIG. 3 is a flow chart illustrating a method of pre-processing a pixel in a picture according to another embodiment;

FIG. 4 is a flow chart illustrating a method of pre-processing a pixel in a picture according to a further embodiment;

FIG. 5 is a flow chart illustrating a method of pre-processing a pixel in a picture according to yet another embodiment;

FIG. 6 is a flow chart illustrating a method of pre-processing a pixel in a picture according to an additional embodiment;

FIG. 7 is a flow chart illustrating steps of a default ("anchor") processing chain according to an embodiment;

FIG. 8 is a flow chart illustrating steps of a first auxiliary ("Ajusty") processing chain according to an embodiment;

FIG. 9 is a flow chart illustrating steps of a second auxiliary ("Ajustc") processing chain according to an embodiment;

FIG. 10 is a flow chart illustrating an additional step of the method shown in FIG. 1 to form a method of encoding a pixel according to an embodiment;

FIG. 11 illustrates a flow chart of a method according to one embodiment;

FIGS. 12A and 12B schematically illustrate performing the Ajusty processing chain in sequential passes;

FIG. 14 is a schematic illustration of hardware implementations of a device according to the embodiments;

FIG. 15 is a schematic illustration of an implementation of a device according to the embodiments with a processor and a memory;

FIG. 21 is a diagram illustrating that there can be different linearizations in different color areas;

FIG. 22 illustrates Barten's curve for contrast sensitivity;

DETAILED DESCRIPTION

Figure 13A:
FIG. 13A illustrate differences between deriving luma component values according to the anchor processing chain and the Ajusty processing chain.

Throughout the drawings, the same reference numbers are used for similar or corresponding elements.

The present embodiments generally relate to pre-processing and encoding of pixels in a picture, and in particular to such pre-processing and encoding that improves luminance and/or chrominance values of pixels.

A traditional compression chain, also denoted default processing chain or anchor processing chain herein, involves feeding pixels of incoming linear light, typically ranging from 0 to 10,000 $cd/m^2$, to an inverse transfer function, which results in new pixel values between 0 and 1. After this, the pixels undergo color transform resulting in a luma component and two chroma components. Then the two chroma components are subsampled, such as to 4:2:0 or 4:2:2. The pixels may then be subject to encoding or compression. After decoding or decompression, the 4:2:0 or 4:2:2 sequences are upsampled to 4:4:4, inverse color transformed and finally a transfer function gives back pixels of linear light that can be output on a monitor.

A combination of a highly non-linear transfer function, chroma subsampling and non-constant luminance ordering gives rise to severe artifacts to the video data, in particular for saturated colors. The trouble comes from the fact that the chroma components are interpolated, whereas the luma component is not. Hence, there can be sharp shift in the luma component in a pixel but the chroma components cannot follow since they are interpolated. For some colors, especially saturated colors, the result is a pixel of completely wrong intensity, which is clearly visible as an artifact.

The pre-processing of pixels according to the embodiments can be used to combat or at least reduce the impact of artifacts, thereby resulting in a color that is closer to the incoming "true" color of a pixel.

One way to get around the problem is described in Annex A, a method that is referred to as Ajusty method or processing chain herein. In the Ajusty processing chain, the luma component value (Y') of a pixel is adjusted so that the resulting linear luminance Y is closer to its correct value ($Y_O$). It is therefore possible to compensate for the fact that some of the luminance information is also carried in the chroma components Cb and Cr.

The Ajusty processing chain improves the luminance of the pixels but at a cost of somewhat increased processing time. As an example, assume that the conversion from RGB 4:4:4 to Y'CbCr 4:2:0 takes x seconds using the anchor processing chain mentioned above. Then compression using the High-Efficiency Video Coding (HEVC) reference encoder HM typically takes 10x seconds, resulting in a total processing time of 11x for the anchor processing chain. Using the Ajusty processing chain with binary search as described in Annex A takes 5x seconds. Since the time to compress using HEVC reference encoder HM stays roughly the same, this means that the total time becomes 15x seconds. In other words, the total encoding complexity rises a factor of 15/11=1.36, i.e. an increase of 36%.

Correspondingly, Annex C describes a method that is referred to as Ajustc herein. In the Ajustc method or processing chain, at least one of the chroma component values (Cb, Cr) is derived in a new processing chain that improves the chrominance of pixels. However, this improvement in chrominance comes at a cost of somewhat increased processing time as compared to the anchor processing chain.

The present embodiments provide a trade-off between improved quality of pixels, such as in the form of improved luminance, improved chrominance or improved luminance and chrominance, and increased processing time and complexity. Accordingly, embodiments are provided that determine for which pixels a default processing chain, such as the anchor processing chain, can be used and for which pixels an auxiliary processing chain, such as the Ajusty processing chain, the Ajustc processing chain or both the Ajusty and Ajustc processing chains, can be used.

In particular, the auxiliary processing chain that may improve the quality of pixels in a picture should preferably only be applied to those pixels that would benefit from the improvement in quality, i.e. for which the auxiliary processing chain leads to a visible quality improvement as compared to the default processing chain. The present embodiments are thereby directed towards improving the luminance and/or chrominance of pixels in a computationally efficient way.

A color space, color domain or color format is the type and number of colors that originate from the combinations of color components of a color model. A color model is an abstract configuration describing the way colors can be represented as tuples of numbers, i.e. color components. The color components have several distinguishing features such as the component type, e.g. hue, and its unit, e.g. degrees or percentage, or the type of scale, e.g. linear or non-linear, and its intended number of values referred to as the color depth or bit depth.

Non-limiting, but illustrative, color spaces that are commonly used for pixels in pictures and videos include the red, green, blue (RGB) color space, the luma, chroma blue and chroma red (YCbCr, sometimes denoted Y'CbCr, Y'Cb'Cr', $YC_BC_R$, $Y'C_BC_R$ $Y'C_B'C_R'$ or YUV, Yuv, or $D'_YD'_{CB}D'_{CR}$ or $E'_YE'_{CB}E'_{CR}$) color space and the luminance and chrominances (XYZ) color space.

FIG. 1 is a flow chart illustrating a method of pre-processing a pixel in a picture. The method comprises determining, in step S1, based on a minimum color component value for the pixel, whether a default processing chain is used to derive a luma component value, a first subsampled chroma component value and a second subsampled chroma component value or whether an auxiliary processing chain is used to derive at least one of the luma component value, the first subsampled chroma component value and the second subsampled chroma component value.

The pre-processing method of the embodiments and as shown in FIG. 1 is a pre-processing that is applied to pixels of a picture, preferably of a video sequence comprising multiple pictures, to output pixels, or more correctly the color component values of the pixels, in a color space and format that is adapted for the following processing of the picture. Thus, the method step S1 in FIG. 1 is preferably applied to at least one pixel in the picture, and more preferably to multiple, i.e. at least two, pixels in the picture, such as all pixels in the picture, which is schematically illustrated by the line L1 in FIG. 1.

In a particular embodiment, the pre-processing of FIG. 1 comprises determining a luma component value, a first subsampled chroma component value and a second subsampled chroma component value for the pixel based on the input or original color component values of the pixel.

In a typical case, the following processing involves compressing or encoding the picture of the video sequence to form a bitstream of encoded pixel data representing the encoded video sequence or stream. Another example of following processing is the transfer of pictures, such as of a video sequence, over an interface, such as high-definition multimedia interface (HDMI), DisplayPort or Thunderbolt. For example, in HDMI 2.0a the only way to convey 4K resolution at 50 or 60 frames per second (fps) is to use 4:2:0 or 4:2:2 Y'CbCr subsampling. If the video data is in full chroma sampling format (4:4:4) then a subsampling pre-processing step must be applied before sending the video data over the HDMI cable. The 4:2:0 or 4:2:2 video data is then transferred over the interface without further compression.

The particular color space and format output from the pre-processing of the embodiments is a luma component value and two chroma component values, i.e. the Y'CbCr color space. In addition, the chroma component values are subsampled, whereas the luma component is not, so the color space and format from the pre-processing is preferably Y'CbCr 4:2:2 or Y'CbCr 4:2:0.

According to the embodiments, the decision as to whether use the default processing chain or the auxiliary processing chain in order to derive at least one of the luma component value (Y'), the first subsampled chroma component value (Cb) and the second subsampled chroma component value (Cr) is made at least partly based on the smallest color component value of the pixel.

This means that the minimum or smallest color component value of a pixel is used to determine whether the luminance and/or the chrominance of the pixel benefits from quality improvement by using the auxiliary processing chain or whether the auxiliary processing chain does not improve the luminance and/or chrominance for the particular pixel or any luminance and/or chrominance improvement achieved by the auxiliary processing chain is too small in relation to the additional processing complexity and time when using the auxiliary processing chain.

The color component values of the pixel that are assessed to determine whether to use the default processing chain or the auxiliary processing chain are preferably of a color space different from luminance+chrominance. This means that the auxiliary processing chain could result in an improvement as seen in luminance (Y) or chrominance, preferably in the XYZ color space, but the decision of which processing chain to use is made in a color space different from the luminance+chrominance color space, i.e. preferably a color space different from the XYZ color space.

In a particular embodiment, the assessment of the color component value is made in the color space of the pixel as input to the pre-processing of the embodiments. This initial color space is typical the RGB color space. In such a case, the decision of whether to use the default processing chain and the auxiliary processing chain is made based on a minimum color component value of a red color component value (R), a green color component value (G) and a blue color component value (B) of the pixel, i.e. min(R, G, B).

In an embodiment, step S1 of FIG. 1 comprises selecting the auxiliary processing chain if the minimum color component value is below a threshold value and otherwise selecting the default processing chain. Hence, in a particular embodiment the auxiliary processing chain is selected in step S1 if min(R, G, B)<T, or more generally if function (min(R, G, B))<T for some function of the minimum of the color component value of the pixel, wherein T represents the threshold value.

It is possible to use different threshold values for the different color components or channels, such as $T_R$ for the red color component, $T_G$ for the green color component and $T_B$ for the blue color component. In such a case, step S1 could comprise selecting the auxiliary processing chain if $R<T_R$ or $G<T_G$ or $B<T_B$, and otherwise selecting the default processing mode. This approach is equivalent to checking if min($w_1$R, $w_2$G, $w_3$G)<T, wherein $w_1$, $w_2$, $w_3$ are non-zero weights.

As illustrative examples, the threshold value T could be 10, i.e. investigating in step S1 whether min(R, G, B)<10. Another illustrative example is min(R, G, B)+0.1<10.1.

In an embodiment, step S1 of FIG. 1 comprises determining, based on the minimum color component value and a maximum color component value for the pixel, whether the default processing chain is used to derive the luma component value, the first subsampled chroma component value and the second subsampled chroma component value or whether the auxiliary processing chain is used to derive the at least one of the luma component value, the first subsampled chroma component value and the second subsampled chroma component value.

In this embodiment, the decision whether to use the default or auxiliary processing chain for a pixel in the picture is made based on the smallest color component value of the pixel and the largest color component value of the pixel. Thus, decision is made based on a function of these two color component values, preferably function(min(R, G, B), max(R, G, B)).

In a particular embodiment, the function is a quotient between the two color component values. For instance, the quotient could be between the maximum color component value or a weighted version thereof and the minimum color component value or a weighted version thereof. In another example, the quotient is between the maximum color component value or a weighted version thereof and a sum of the minimum color component value or a weighted version thereof and a constant. These various examples could therefore be expressed as i) max(R, G, B)/min(R, G, B); ii) max($w_1$×R, $w_2$×G, $w_3$×B)/min(R, G, B); iii) max(R, G, B)/(min($w_1$×R, $w_2$×G, $w_3$×B)); iv) max($w_1$×R, $w_2$×G, $w_3$×B)/(min($w_1$×R, $w_2$×G, $w_3$×B)); v) max(R, G, B)/(min(R, G, B)+s); vi) max($w_1$×R, $w_2$×G, $w_3$×B)/(min(R, G, B)+s); vii) max(R, G, B)/(min($w_1$×R, $w_2$×G, $w_3$×B)+s); viii) max($w_1$×R, $w_2$×G, $w_3$×B)/(min($w_1$×R, $w_2$×G, $w_3$×B)+s), wherein $w_1$, $w_2$ and $w_3$ are non-zero weights and s is the constant. In an embodiment, the constant s is a non-zero constant, preferably a small positive value that is used to prevent the risk of division by zero if min(R, G, B) would be equal to zero. For instance, s could be 0.1.

It is possible to have different non-zero weights for the RGB color component values in the min(.) function as compared to the non-zero weights for the RGB color components in the max(.) function.

The weights $w_1$, $w_2$, $w_3$ could be used to weight the color components differently, such as weight one of the color components, for instance G, more than the other color components. In a particular embodiment, $w_1+w_2+w_3=1$. In an additional but optional embodiment, $w_2>w_1$ and $w_2>w_3$.

In another embodiment, the weights $w_1$, $w_2$, $w_3$ are set to values used for calculating the luminance (Y) from the RGB color, such as line two in equation 5 or 6, i.e. $w_1$=0.262700, $w_2$=0.677998, $w_3$=0.059302 or $w_1$=0.212639, $w_2$=0.715169, $w_3$=0.072192.

In a further embodiment, the weights $w_1$, $w_2$, $w_3$ are set to values used for calculating the chroma components from a R'G'B' color, such as according to line two or three in equation 1, 2 or 3.

Hence, in an embodiment step S1 comprises determining, based on a quotient between the maximum color component value or a weighted version thereof and 1) the minimum color component value or a weighted version thereof, or 2) a sum of the minimum color component value or the weighted version thereof and a constant, whether the default processing chain is used to derive the luma component value, the first subsampled chroma component value and the second subsampled chroma component value or whether the auxiliary processing chain is used to derive at least one of the luma component value, the first subsampled chroma component value and the second subsampled chroma component value.

In a particular embodiment, step S1 comprises selecting the auxiliary processing chain if the quotient exceeds a threshold value and otherwise selecting the default processing chain.

For instance, a function value h(R, G, B) could be calculated based on the color component values of the pixels (R, G, B) and where this function value h(R, G, B) is based on the above mentioned quotient. For instance, h(R, G, B)=max(R, G, B)/(min(R, G, B)+s) or h(R, G, B)=max($w_1$×R, $w_2$×G, $w_3$×B)/(min($w_1$×R, $w_2$×G, $w_3$×B)+s). The function value h(R, G, B) is then compared to a threshold value and this comparison is used to decide whether to pre-process the current pixel according to the default processing chain or the auxiliary processing chain.

FIG. 2 schematically illustrates such an embodiment. The method starts in step S10, which comprises calculating a function value, preferably as max/(min+s), wherein max represents the maximum color component value or the weighted version thereof, min represents the minimum color component value or the weighted version thereof and s is a constant. The method then continues to step S11, which comprises comparing the function value with a threshold value.

The method proceeds to step S1 in FIG. 1, which comprises, in this embodiment, selecting the auxiliary processing chain if the function value exceeds the threshold value and otherwise selecting the default processing chain.

In an example, the constant s is equal to 0.1 and the threshold value is equal to 2, i.e. selecting the auxiliary processing chain if max(R, G, B)/(min(R, G, B)+0.1)>2.

In the above described embodiments, the quotient or function value is calculated for a current pixel to be pre-processed, i.e. for which the luma value and the two sub-sampled chroma component values are to be determined. In an alternative approach, the calculations can be made in advance to form a look-up table (LUT). In such a case, the color component values for the pixel are input into the LUT and the output is then an indication of whether to pre-process the according to the default or auxiliary processing chain. In a particular embodiment, the indication is a one-bit value ($0_{bin}$ or $1_{bin}$).

This embodiment is illustrated in the flow chart of FIG. 3. The method starts in step S20, which comprises inputting color component values for the pixel in a LUT configured to output a first value if the quotient exceeds a threshold value and otherwise output a second value. A next step S21 comprises selecting the auxiliary processing chain if a value output from the LUT is equal to the first value (exemplified by $1_{bin}$ in the figure) and selecting the default processing chain if the value output form the LUT is equal to the second value (exemplified by $0_{bin}$ in the figure).

In the following various embodiments of the default and auxiliary processing chains will be further described with reference to FIGS. 4 to 11.

In a first embodiment, the subsampled chroma component values are derived for the pixel according to the default processing chain. The selection between the default and auxiliary processing chain is then made as described herein to decide whether to determine the luma component value for the pixel according to the default processing chain or the auxiliary processing chain. In this embodiment, the auxiliary processing chain is preferably the Ajusty processing chain described in more detail in Annex A.

FIG. 4 illustrates a method of pre-processing a pixel in a picture according to this embodiment. The method starts in step S30, which comprises deriving the first subsampled chroma component value and the second subsampled chroma component value using the default processing chain. The method then continues to step S31, which comprises determining, based on the minimum color component value, whether the default processing chain is used to derive the luma component value or whether a first auxiliary processing chain is used to derive the luma component value.

In a second embodiment, the luma component value is derived for the pixel according to the default processing chain. The selection between the default and auxiliary processing is then made as described herein to decide whether to determine the subsampled chroma component values according to the default processing chain or the auxiliary processing chain. In this embodiment, the auxiliary processing chain is preferably the Ajustc processing chain described in more detail in Annex C.

FIG. 5 illustrates a method of pre-processing a pixel in a picture according to this embodiment. The method starts in step S40, which comprises deriving the luma component value using the default processing chain. The method continues to step S41, which comprises determining, based on the minimum color component value, whether the default processing chain is used to derive the first subsampled chroma component value and the second subsampled chroma component value or whether a second auxiliary processing chain is used to derive the first subsampled chroma component value and the second subsampled chroma component value.

The subsampling of the first and second chroma component values, i.e. in the Y'CbCr 4:2:0 or 4:2:2 format, implies that each chroma component value influences several pixels during decoding, i.e. when the subsampled chroma component values are upsampled back to Y'CbCr 4:4:4 format. For instance, if nearest neighbor upsampling is used, each first and second chroma component values is used for four neighboring pixels. If other types of upsamplings are used, involving longer filters, then more than four pixels may be influenced by the upsampling, such as pixels in a 7×7 pixel area. Pixels near the center of this pixel area will be influenced much more and pixels near the edge or perimeter of the pixel area will be influenced much less.

In an embodiment, the determination in step S41 may thereby be performed based on the minimum color component value of at least one pixel within a pixel area comprising multiple pixels in the picture. The pixel area is defined as a portion of the picture enclosing pixels influenced or affected by upsampling of the first subsampled chroma component value and the second subsampled chroma component value.

In an embodiment, a respective function value, max/(min+s), is calculated for each pixel in the pixel area or for a subset of the pixels in the pixel area. Examples of such a subset include 2×1 pixels, 1×2 pixels and 2×2 pixels.

In an embodiment, the auxiliary processing chain is selected if at least one of the function values exceeds the threshold value and otherwise selecting the default processing chain. In another embodiment, the auxiliary processing chain is selected if the function values for all pixels in the subset of pixels in the pixel area exceeds the threshold value and otherwise selecting the default processing chain. Further embodiments include selecting the auxiliary processing chain if the average of the function values for all pixels in the subset of pixels in the pixel area or the average of the function values for all pixels in the pixel area exceeds the threshold value and otherwise selecting the default processing chain.

In a third embodiment, the selection between the default and auxiliary processing chain is made as described herein to decide whether to determine the luma component value and the subsampled chroma component values according to the default processing chain or whether to determine the luma component value according to a first auxiliary processing chain and determine the subsampled chroma component values according to a second auxiliary processing chain. In this embodiment, the first auxiliary processing chain is preferably the Ajusty processing chain described in more detail in Annex A and the second auxiliary processing chain is preferably the Ajustc processing chain described in more detail in Annex C.

FIG. 6 illustrates a method of pre-processing a pixel in a picture according to this embodiment. The method comprises determining, in step S50 and based on the minimum color component value, whether the default processing chain is used to derive the luma component value, the first subsampled chroma component value and the second subsampled chroma component value or whether a first auxiliary processing chain is used to derive the luma component value and a second auxiliary processing chain is used to derive the first subsampled chroma component value and the second chromap component value.

The decision whether to use the default processing chain or the first auxiliary processing chain (FIG. 4), the second auxiliary processing chain (FIG. 5), the first and second auxiliary processing chains (FIG. 6) can be made as previously described herein, i.e. based on the minimum color component value or based on the minimum and maximum color component value.

The embodiments as disclosed in FIGS. 4 to 6 are preferably applied to multiple pixels in a picture, such as to all pixels in the picture, which is schematically illustrated by the lines L2, L3 and L4 in FIGS. 4, 5 and 6, respectively.

FIG. 7 is a flow chart illustrating method steps performed according to default processing chain, also referred to as the anchor processing chain. The method continues from step S31, S41 or S50 in FIGS. 4 to 6. The method comprises applying, in step S60, a first transfer function (TF) to a linear color in a first color space to obtain a non-linear color in the first color space. A next step S61 comprises applying a first color transform (CT) to the non-linear color in the first color space to obtain the luma component value and two chroma component values in a second color space. The following step S62 comprises subsampling the two chroma component values in the second color space to obtain the first subsampled chroma component value and the second subsampled chroma component value in the second color space.

In an embodiment of the anchor processing chain of FIG. 7, a first transfer function, such as the inverse of the transfer function (equation A1) in Annex A, is applied to the initial or input $R_0G_0B_0$ color of the pixel, i.e. the original color of the pixel, to get a non-linear color R'G'B' in the RGB color space. This R'G'B' color is then color transformed from the RGB color space to the YCbCr color space using a first color transform, such as the color transform:

$$Y'=0.212600R'+0.715200G'+0.072200B'$$

$$Cb=-0.114572R'-0.385428G'+0.500000B'$$

$$Cr=0.500000R'-0.454153G'-0.045847B' \quad \text{(equation 1)}$$

$$Y'=0.299000R'+0.587000G'+0.114000B'$$

$$Cb=-0.168736R'-0.331264G'+0.500000B'$$

$$Cr=0.500000R'-0.418688G'-0.081312B' \quad \text{(equation 2)}$$

$$Y'=0.262700R'+0.678000G'+0.059300B'$$

$$Cb=-0.139630R'-0.360370G'+0.500000B'$$

$$Cr=0.500000R'-0.459786G'-0.040214B' \quad \text{(equation 3)}$$

The color transform specified in equation 1 is defined in ITU-R BT.709, which is primarily used for High Definition Television (HDTV). Another color transform that could be used is shown in equation 2 and as defined in ITU-R BT.601, which is primarily used for Standard Definition Television (SDTV). The corresponding equation when RGB originates from BT.2020 is presented in equation 3.

The resulting Y'CbCr color of the pixel following the application of the first color transform in step S61 is a non-compressed Y'CbCr color, i.e. in the 4:4:4 format. The following step S62 subsamples the two chroma components Cb and Cr to get a color in the 4:2:0 or 4:2:2 format, i.e. with subsampled non-linear chroma components Cb and Cr.

Subsampling in step S62 can be performed according to known subsampling techniques. For instance, a filtering operation or a nearest neighbor operation can be used. An example of subsampling technique that can be used according to the embodiments is disclosed in section 8.1.5.5 Chroma downsampling from 4:4:4 to 4:2:0 in document [5].

The default processing chain, i.e. the anchor processing chain, can be summarized according to below:
$R_0G_0B_0$ 4:4:4→(first transfer function)→R'G'B' 4:4:4→(first color transform)→Y'CbCr 4:4:4→(subsampling of Cb and Cr)→Y'CbCr 4:2:0

FIG. 8 is a flow chart illustrating method steps performed according to the first auxiliary processing chain, also referred to as the Ajusty processing chain. The method continues from step S31 or S50 in FIG. 4 or 6. The method comprises obtaining, in step S70, an original linear luminance component value of the pixel in a third color space determined based on a linear color of the pixel in a first color space. The method also comprises deriving the luma component value in a second color space based on two chroma component values in the second color space and the original linear luminance component value in the third color space.

In an embodiment, the third color space mentioned above is the XYZ color space. Accordingly, the linear luminance component value of the pixel in the third color space is, in this embodiment, a Y component value.

In an embodiment, obtaining the original linear luminance component comprises determining the original linear luminance component value in the third color space based on the linear color of the pixel in the first color space. This original linear luminance component value preferably reflects the true luminance of the pixel, i.e. the original luminance of the pixel prior to any color transformation, application of transfer functions and subsampling. This original linear luminance component value is determined based on the linear color of the pixel in the first color space. In an embodiment, this linear color of the pixel in the first color space is the original incoming color of the pixel. In a particular embodiment, this original incoming color is a $R_0G_0B_0$ herein and the original linear luminance component is denoted $Y_0$.

The original linear luminance is, thus, the target luminance which could be calculated in many different ways. This original linear luminance does not necessarily have to correspond directly to the actual luminance of the sensor in the camera taking a picture or recording a video or in the panel of the display.

The original linear luminance component value in the third color space could be obtained to the pre-processing and encoding functionality as an original linear luminance component value, preferably $Y_0$ value, in a pre-determined or pre-calculated form. This means that the determination of the original linear luminance component value based on the linear color in the first color space has already taken place and only the result of the determination is provided to the pre-processing and encoding functionality.

In an alternative embodiment, the pre-processing of the embodiments comprises determination or calculation of the original linear luminance component value as described above. In particular, $Y_0=g(R_0, G_0, B_0)$, see equation 5 or 6 for examples of the function g(.). In equation 5 and 6, only the second line need to be calculated to obtain the original linear luminance component value.

The luma component value in the second color space is then derived in step S71 based on the two chroma component values in the second color space and the original linear luminance component value in the third color space. Hence, in an embodiment, the luma component Y' in the YCbCr color space is a function of the Cb and Cr components in the YCbCr color space and the $Y_0$ component in the XYZ color space, i.e. $Y'=f(Cb, Cr, Y_0)$. The $Y_0$ component is in turn determined based on the $R_0G_0B_0$ color of the pixel in the RGB color space, i.e. $Y_0=g(R_0, G_0, B_0)$. Accordingly, $Y'=f(Cb, Cr, g(R_0, G_0, B_0))$.

In an embodiment, step S71 of FIG. 8 comprises deriving a luma component value in the second color space that minimizes a difference between the original linear luminance component value in the third color space and a linear luminance component value in the third color space determined based on the luma component value in the second color space, the first subsampled chroma component value in the second color space and the second subsampled chroma component value in the second color space. Hence, in this embodiment, step S71 involves finding the luma component value (Y') in the second color space (YCbCr) that minimizes the difference between the original linear luminance component value ($Y_0$) and the linear luminance component value (Y) in the third color space (XYZ). This linear luminance component value (Y) in the third color space (XYZ) is in turn obtained based on the luma component value (Y') and the two subsampled chroma component values (Cb, Cr) in the second color space (YCbCr).

Thus, this embodiment involves finding the Y' component value that minimizes the difference $|Y_0-Y|$ or $(Y_0-Y)^2$, wherein $Y=h(Y', Cb, Cr)$ and $h(.)$ defines that Y is determined based on Y', Cb and Cr.

In an alternative but related embodiment, step S71 involves deriving a luma component value in the second color space that minimizes a difference between a function of the original luminance component value in the third color space and a function of a linear luminance component value in the third color space. This linear luminance component value in the third color space is determined based on the luma component value in the second color space, the first subsampled chroma component value in the second color space and the second subsampled chroma component value in the second color space.

Thus, this embodiment involves finding the Y' component value that minimizes the difference $|k(Y_0)-k(Y)|$ or $(k(Y_0)-k(Y))^2$, wherein $Y=h(Y', Cb, Cr)$.

The function (k(.)) is preferably an inverse transfer function, such as the inverse of the transfer function in equation A1 as shown in Annex A.

In an embodiment, the two subsampled chroma component values in the second color space, preferably as obtained from the default or anchor processing chain as previously described herein, are upsampled to obtain an upsampled first chroma component value in the second color space and an upsampled second chroma component value in the second color space. A second color transform is then applied to a candidate luma component value in the second color space, the upsampled first chroma component value in the second color space and the upsampled second chroma component value in the second color space to obtain a non-linear color in the first color space. A second transfer function is applied to the non-linear color in the second color space to obtain a linear color in the first color space. Finally, a third color transform is applied to the linear color in the first color space to obtain a linear luminance component value in the third color space. In this case, the luma component value is derived in step S71 based on a comparison of the original linear luminance component value in the third color space and the linear luminance component value in the third color space.

Thus, in an embodiment, the subsampled Cb and Cr component values in 4:2:0 or 4:2:2 format are first upsampled to the 4:4:4 format. Upsampling can be performed according to known upsampling techniques. For instance, upsampling could be performed by using bilinear or longer filters. An example of upsampling technique that can be used according to the embodiments is disclosed in section B.1.5.6 Chroma upsampling from 4:2:0 to 4:4:4 (Y'CbCr domain) in document [5].

These two upsampled Cb and Cr component values are then input together with a candidate Y' component value into a second color transform to get a non-linear R'G'B' color, such as the color transform:

$$R'=Y'+a13Cr$$

$$G'=Y'-a22Cb-a23Cr$$

$$B'=Y'+a32CCb \quad \text{(equation 4)}$$

For Rec.709 color space a13=1.57480, a22=0.18732, a23=0.46812, a32=1.85560 and for BT.2020 color space a13=1.47460, a22=0.16455, a23=0.57135, a32=1.88140.

Generally, R', G' and B' can assume values within the interval [0, 1]. Accordingly, the second color transform may also include a clamping or clipping operation, such as R'=clip(Y'+a13Cr, 0, 1) for the R' component, wherein clip(x, a, b) is equal to a if x<a and equal to b if x>b and otherwise equal to x.

This R'G'B' color is then input into a second transfer function, such as the transfer function (equation A1) in Annex A, to get a linear RGB color. This RGB color is then transformed from the RGB color space to the XYZ color space using a third color transform, such as the color transform in equation 5 when RGB originates from BT.2020 or equation 6 when RGB originates from BT.709:

$$X=0.636958R+0.144617G+0.168881B$$

$$Y=0.262700R+0.677998G+0.059302B$$

$$Z=0.000000R+0.028073G+1.060985B \quad \text{(equation 5)}$$

$$X=0.412391R+0.357584G+0.180481B$$

$$Y=0.212639R+0.715169G+0.072192B$$

$$Z=0.019331R+0.119195G+0.950532B \quad \text{(equation 6)}$$

The linear luminance component Y value output form the third color transform is then compared to the original linear luminance component $Y_0$ value of the pixel.

In an embodiment, step S71 of FIG. 8 comprises selecting a candidate luma component value in the second color space that reduces a difference between the original linear luminance component value in the third color space and the linear luminance component value in the third color space.

Thus, step S71 preferably comprises selecting a candidate luma component value in the second color space that leads to at least a reduction in the difference between the original linear luminance component value and the linear luminance component value. In a particular embodiment, step S71 comprises selecting a candidate luma component value in the second color space that minimizes the difference between the original luminance component value and the linear luminance component value in the third color space. This difference could, as mentioned in the foregoing, be represented as $|Y_0-Y|$ or $(Y_0-Y)^2$.

In an alternative but related embodiment, step S71 involves selecting a candidate luma component value in the second color space that reduces or, preferably, minimizes a difference between a function of the original luminance component value in the third color space and a function of the linear luminance component value in the third color space, i.e. selecting the candidate Y' component value that minimizes the difference $|k(Y_0)-k(Y)|$ or $(k(Y_0)-k(Y))^2$.

In an embodiment, different candidate luma component values in the second color space are tested. In such a case, step S71 preferably comprises selecting the candidate luma component value among the different candidate luma component values in the second color space that results in a smallest difference between the original linear luminance component value in the third color space and the linear luminance component value in the third color space or a smallest difference between a function of the original linear luminance component value in the third color space and a function of the linear luminance component value in the third color space.

The following embodiments are described in more detail with regard to a difference between the original linear luminance component value in the third color space and the linear luminance component value in the third color space. These embodiments also encompass a difference between a function of the original linear luminance component value in the third color space and a function of the linear luminance component value in the third color space. The function is preferably, as previously mentioned herein, the inverse of a transfer function, such as an inverse of the transfer function in equation A1 in Annex A.

The selection of the optimal candidate Y' component value among multiple candidate Y' component values can be performed according to various embodiments as described further herein.

A first embodiment involves performing a binary search. Hence, in this embodiment the method comprises performing a binary search to select a candidate luma component value in the second color space that minimizes a difference between the original linear luminance component value in the third color space and the linear luminance component value in the third color space.

A binary search is an efficient technique that can be used to find the optimal candidate luma component value. Generally, a binary search algorithm begins by comparing the original luminance component value in the third color space to the linear luminance component value in the third color space obtained using the middle element of a sorted array of possible candidate luma component values in the second color space. If the linear luminance component value in the third color space is equal to the original luminance component value in the third color space or differs from the original luminance component value in the third color space with not more than a defined amount, then the position of the middle element is returned and the search is finished. If the linear luminance component value is greater than the original linear luminance component value, then the search continues on the lower half of the array; or if the linear luminance component value is less than the original linear luminance component value, then the search continues on the upper half of the array. This process continues, eliminating half of the elements, and comparing the resulting linear luminance component value to the original linear luminance component value, until the difference there between is zero or until the entire array has been searched, i.e. until all elements except one has been eliminated. This is guaranteed to only take $\log_2(N)$ steps, where N is the number of possible candidate luma component values in the array. For instance, assume that the candidate luma component values can be selected from the array of [0, 1023]. Then N=1024 and $\log_2(1024)$=10.

The selection of a search interval generally involves selecting a search interval having approximately half the size as compared to the search interval used above. For instance, if the search interval contains the values 100, 101, 102, 103 then one could choose either 101 or 102 as the "middle value", resulting in a "halved" search interval of [100, 101] (a true halving of the search interval) or [101, 103] (an approximate halving of the search interval) or a "halved" search interval of [100, 102] (an approximate halving of the search interval) or [102, 103] (a true halving of the search interval).

Another embodiment is to regard the selection of luma component value as an optimization problem and minimizes the error $E=(Y_0-Y)^2$ or $E=|Y_0-Y|$ with regard to Y'. This can be done, for instance, by gradient descent, by calculating the gradient of E with respect to Y', i.e. dE/dY', and update Y' a small amount in the opposite direction of the gradient, i.e. $Y'_{n+1}=Y'_n-\alpha(dE/dY')$, where $\alpha$ is a small constant.

Gradient descent can be slow, so a quicker way may be to use a second-order optimization algorithm that calculates or approximates the second order derivatives $d^2E/dY'^2$. Gauss-Newton is an example of such an algorithm.

A further embodiment involves using a LUT when selecting the luma component value. Such a LUT may, for instance, comprise the best Y' component value for every possible combination of Cb, Cr and $Y_0$ component values. Assume, for instance, that the Cb and Cr components are quantized to 10 bits and that the $Y_0$ component is also quantized to 10 bits. Then the LUT should contain $2^{10} \times 2^{10} \times 2^{10}$ different Y' component values. This is equivalent to $2^{30}$ Y' component values. If each such Y' component value is two bytes, the LUT will have a size of $2^{31}$ bytes, or 2 Gb.

It may also be possible to use a smaller LUT. For instance, it may be possible to quantize the $Y_0$, Cb and Cr components to a smaller size, say 6 bits. Then the LUT would be $2^{18}$ Y' component values, or $2^{19}$ bytes, which is equal to 512 kb.

The $Y_0$ component is linear. Accordingly, it may be inefficient to just quantize it. It may instead be better to use a function of $Y_0$ together with the Cb and Cr as input to the LUT to get the optimal Y' component. The function preferably outputs a non-linear representation of the $Y_0$ component and may, for instance, be an inverse transfer function (TF−1(.)), such as the inverse of the transfer function in equation A1 in Annex A. The optimal Y' component value is then derived from the LUT as Y'=LUT(Cb, Cr, $TF^{-1}(Y_0)$).

The Ajusty processing chain of deriving the non-linear luma component value Y' involves, in an embodiment, the following pre-processing steps:
$R_0G_0B_0$ 4:4:4→(third CT)→$X_0Y_0Z_0$ 4:4:4→$Y_0$ 4:4:4---+------→Y'=Ajusty($Y_0$ 4:4:4, CbCr 4:4:4) Y'CbCr 2:2:2→CbCr 2:2:2→(upsampling)→CbCr 4:4:4—/
where $Y_0$ 4:4:4 is the luminance component of XYZ 4:4:4 and CbCr 4:4:4 are the upsampled chroma components of Y'CbCr. In short, the target luminance $Y_0$ 4:4:4 is found by first converting $R_0G_0B_0$ 4:4:4 to $X_0Y_0Z_0$ 4:4:4 using the third color transform and then using $Y_0$ 4:4:4. We then get CbCr 4:4:4 by upsampling Y'CbCr 2:2:2 to 4:4:4 format and using CbCr 4:4:4. Finally, the Ajusty processing chain described above and further shown in Annex A is used on $Y_0$ 4:4:4 and CbCr 4:4:4 to find the best Y' 4:4:4.

FIG. 9 is a flow chart illustrating method steps performed according to the second auxiliary processing chain, also referred to as the Ajustc processing chain. The method continues from step S41 or S50 in FIG. 5 or 6. The method comprises subsampling, in step S80 a linear color in a first color space to obtain a subsampled linear color in the first color space. A next step S81 comprises applying a first transfer function to the subsampled linear color in the first color space to obtain a subsampled non-linear color in the first color space. The method continues to step S82, which comprises applying a first color transform to the subsampled non-linear color in the first color space to obtain the first subsampled chroma component value and the second subsampled chroma component value in a second color space.

In clear contrast to the default processing chain, the Ajustc processing chain involves subsampling of a linear color, i.e. subsampling is performed in a linear color domain. The generation of a non-linear color then takes place following the subsampling, i.e. the first transfer function is applied to a subsampled linear color.

The default processing chain as shown in FIG. 7 instead first applies a transfer function to a linear color to obtain a non-linear color. A color transform is then applied to the non-linear color followed by subsampling.

In an embodiment, the first color space is an RGB color space and the linear color is thereby an RGB color, denoted $R_0G_0B_0$ herein. The initial color is in unsampled or original format, i.e. 4:4:4 format. This $R_0G_0B_0$ 4:4:4 color is then preferably subsampled in step S80 to get a subsampled RGB color, i.e. RGB 2:2:2 color. Step S81 comprises applying a first transfer function to the RGB 2:2:2 color to obtain a subsampled non-linear color R'G'B' 2:2:2. The "'" is used to indicate that the red, green and blue color components are non-linear color components. In an embodiment, the first transfer function is the inverse of the transfer function in equation A1 shown in Annex A. The resulting subsampled non-linear color R'G'B' 2:2:2 is then color transformed from the RGB color space to the second color space using a first color transform. This second color space is preferably the YCbCr color space and the first color transform is preferably the color transform specified in any of equations 1 to 3.

The first color transform results in a Y'CbCr 2:2:2 color. In an embodiment, the subsampled luma component value Y', the first subsampled chroma component value Cb and the second subsampled chroma component value Cr, all in the YCbCr color space, are obtained in step S83. In an alternative embodiment, only the subsampled chroma component values Cb, Cr are calculated in step S82 thereby basically omitting the first line relating to the luma component Y in equations 1-3. In such an approach, step S83 comprises applying the first color transform to the subsampled non-linear color in the first color space to obtain the first subsampled non-linear chroma component value and the second subsampled chroma component value in the second color space.

According to an embodiment, the following pre-processing chain is used in the Ajustc processing chain:

$R_0G_0B_0$ 4:4:4→(subsampling of RGB)→RGB 2:2:2→(first transfer function)→R'G'B' 2:2:2→(first color transform)→Y'CbCr 2:2:2

Here we have used the term 2:2:2 to indicate that all three samples are at half resolution in both the vertical and horizontal directions, i.e. x- and y-dimension. In this way, we do not get a full-resolution luma Y' component, since the Y' component in the last step is in 2:2:2 format, i.e. half resolution in both directions.

In an embodiment, step S80 comprises subsampling the linear color in the first color space in both vertical and horizontal direction to obtain the subsampled linear color in the first color space. Such an approach results in, with a full resolution luma component in the second color format, a Y'CbCr color in the 4:2:0 format. In another embodiment, step S80 comprises subsampling the linear color in the first color space in only one direction, such as the horizontal direction or the vertical direction, to obtain the subsampled linear color in the first color space. This embodiment instead results in, with the full resolution luma component in the second color format, a Y'CbCr color in the 4:2:2 format.

Subsampling in step S80 can be performed according to known subsampling techniques. For instance, a filtering operation or a nearest neighbor operation can be used. An example of subsampling technique that can be used according to the embodiments is disclosed in section B.1.5.5 Chroma downsampling from 4:4:4 to 4:2:0 in document [5].

The pre-processing of pixels according to the embodiments can be used in different applications, in particular different video applications, including video encoding.

An embodiment therefore relates to a method of encoding a pixel in a picture. The method comprises pre-processing the pixel according to any of the embodiments as disclosed herein to derive the luma component value, the first subsampled chroma component value and the second subsampled chroma component value. The method also comprises, in step S2 as shown in FIG. 10, encoding the luma component value, the first subsampled chroma component value and the second subsampled chroma component value.

Thus, the pre-processing of pixels can be used as an additional processing during encoding pixels of pictures, such as in connection with encoding pictures of a video sequence.

The output of the pre-processing, i.e. Y'CbCr, such as in the 4:2:0 or 4:2:2 format, is then input to a video encoder, such as a H.264 video encoder, a HEVC or H.265 video encoder, or another video encoder. The encoding as performed by the video encoder can include traditional video encoding steps, such as inter prediction, intra prediction, mode decision, transformation of residual, quantization and encoding of the transformed and quantized residuals, such as in an entropy encoder, e.g. a context-adaptive binary arithmetic coding (CABAC) encoder. These video encoding steps are well known in the art.

An advantage of the pre-processing of the embodiments is that it can be applied to any video or picture encoding process without the need for performing any adjustments in the video or picture encoder or any adjustments in the corresponding video or picture decoder. In clear contrast, the pre-processing can be seen as an additional processing, i.e. pre-processing, that is applied to the input pictures instead of the traditional conversion of original colors, such as $R_0G_0B_0$ colors, of pixels in pictures to be encoded into Y'CbCr colors that involves application of transfer function, application of color transform and chroma subsampling.

The pre-processing of pixels in pictures, such as of a video sequence, may also be used in other applications besides video encoding as previously mentioned herein. Such other applications include transferring video over an interface, such as HDMI, DisplayPort or Thunderbolt.

To solve the problems previously described herein, embodiments are provided that determine for which pixels the anchor processing chain can be used and for which pixels the Ajusty processing chain can be used. A plurality of different particular embodiments are provided below. To further improve the disclosure, descriptions on how to lower the size of the LUT tables needed for quick calculation of Ajusty are also provided.

According to a first aspect a method is provided as illustrated in FIG. 11. The method can be performed in an encoder or in a pre-process to the encoder. In the method, it is determined for which pixels the anchor processing chain can be used and for which pixels the Ajusty processing chain can be used. The determination can be done according to any of the embodiments below or a combination thereof.

An advantage is that at least some of the embodiments provide a faster conversion from RGB 4:4:4 to Y'CbCr 4:2:0 than previous art.

A further advantage is that at least some of the embodiments provide a conversion from RGB 4:4:4 to Y'CbCr 4:2:0 that uses less memory than previous art.

A yet further advantage is that at least some of the embodiments provide a conversion from RGB 4:4:4 to Y'CbCr 4:2:0 that is of a higher quality than previous art.

Particular Embodiments

In certain embodiments, it is proposed to take advantage of the fact that in most pixels the correction needed in Y' is not so big. As an example, if the Y' produced by the anchor processing chain, i.e. default processing chain, from hereon called Y'anchor, is 453, where 0 or 64 is the smallest possible value and 940 or 1023 is the largest possible value, and the Y' produced by the Ajusty processing chain, i.e. the auxiliary processing chain, from hereon called Y'ajusty, is 454, it may not be possible to see the difference in an actual image. In fact, the number of pixels where the Y'anchor and Y'ajusty differ by more than two steps is very small, typically less than 5%. Therefore, the proposed solution is to detect these pixels and apply the Ajusty processing chain only on them. In case only 5% of the pixels need correction, the conversion time may be reduced to (0.05*5×+0.95*×)=1.2×. The total complexity thus rises from 11× to 11.2×, a factor of 11.2/11=1.0182, i.e., an increase of 1.8%. That is much better than an increase of 36%.

In a first embodiment, a pixel with colors (R, G, B) is selected for the Ajusty processing chain if a function h(R, G, B) exceeds a threshold. An example of such a function is h(R, G, B)=max(R, G, B)/(min(R, G, B)+s), where min(a, b,c) calculates the minimum of the three inputs a, b, c and max(a, b, c) calculates the maximum of the three inputs a, b, c, and s is a constant, such as 0.1.

In a second embodiment we use another function h(.) according to h(R, G, B)=max(w1*R, w2*G, w3*B)/(min (w1*R, w3*G, w3*B)+s).

In third embodiment, a pixel with the Y'CbCr components (Y', Cb, Cr) is selected for the Ajusty processing chain if a function g(Y', Cb, Cr) exceeds a threshold. An example of such a function is g(Y', Cb, Cr)=h(RGBptoRGB(YpCbCr-ToRGBp(Y', Cb, Cr)), where h(.) is the function above, RGBptoRGB(.) converts a color from R'G'B' to RGB using a transfer function TF(.), i.e. R'=TF(R), G'=TF(G), and B'=TF(B), and where YCbCrToRGBp(.) converts a color from Y'CbCr to R'G'B', for instance using:

$$R' = Y' + 1.47460 \times Cr$$

$$G' = Y' - 0.16455 \times Cb - 0.57135 \times Cr$$

$$B' = Y' + 1.88140 \times Cb. \quad \text{(equation 7)}$$

A transfer function, such as PQ used in Annex A (see equation A1) can be used.

In a 4th embodiment, a LUT, such as a 1-bit LUT, is employed and calculations according to the first and the second embodiments are stored in the LUT in order to fast determine if the Ajusty processing chain should be invoked or not, e.g. if the value of the LUT for a specific combination of R,G,B is equal to 1, the Ajusty processing chain should be used on the pixel to get Y'.

```
if 1bitLUT(R'10bit, G'10bit, B'10bit) == 1
    use Ajusty processing chain on pixel to get Y'
else
    use Y' from anchor processing chain
end
``` where R'10bit is a 10 bit quantization of R'; R'10bit=round(1023×R'), and ditto for G'10bit and B'10bit.

The 1-bit lookup-table can be created by trying all possible combinations of R'10bit, G'10bit, B'10bit, and see which ones would likely result in a big difference between Y'anchor and Y'ajusty. For example, the table can calculate RGB from R'G'B' using $$R = TF^{-1}(R'10bit/1023),$$

$$G = TF^{-1}(G'10bit/1023),$$

$$B = TF^{-1}(B'10bit/1023),$$

where $TF^{-1}$ is the inverse to the transfer function TF(.). PQ described in Annex A (equation A1) is an example of a transfer function. After that, the function h(R, G, B) described above can be used. If h(R, G, B) is larger than a threshold, the bit is set to 1 for that table entry. If it is smaller than the threshold, the bit is set to 0 for that table entry.

Since R'10bit, G'10bit and B'10bit are all 10 bits, we need $2^{10+10+10}=2^{30}$ entries. However, since each entry is 1 bit we only need $2^{30}/8=2^{30-3}=2^{27}$ bytes, which equals 128 MB. Since R', G' and B' are readily available in the processing chain, they constitute the first thing that is calculated in the anchor processing chain, it may be quicker and hence more desirable to use such a 1-bit-LUT than to calculate h(.).

In a 5th embodiment, the values R'10bit, G'10bit, B'10bit may be quantized to, say 8-bits instead. This shrinks the size of the LUT by a factor of 2×2×2=8, meaning the LUT only takes about 16 MB.

In a 6th embodiment, the LUT uses R, G, B instead of R' G' B'.

In a 7th embodiment, the LUT uses Y', Cb, Cr instead of R' G' B'.

In an 8th embodiment, a 2-dimensional 1-bit look-up table is employed according to the following:

```
RGBmax = max(R'10bit, G'10bit, B'10bit)
RGBmin = min(R'10bit, G'10bit, B'10bit)
if( 1bit2DLUT(RGBmax, RGBmin) == 1)
    use Ajusty processing chain on pixel to get Y'
else
    use Y' from anchor processing chain
end
```

The two-dimensional 1-bit lookup table can be created by trying all possible combinations of R'10bit, G'10bit and B'10bit and see which ones would likely result in a big difference between Y'anchor and Y'ajusty. Assume we have such a function called likelyBigDifference(R'10bit, G'10bit, B'10bit) that returns 1 if the color (R'10bit, G'10bit B'10bit) is likely to result in a big difference between Y'anchor and Y'ajusty and 0 otherwise. The two-dimensional 1-bit lookup table can then be created using

```
1bit2DLUT(x,y) = 0 for all entries x,y
for all R'10bit
    for all G'10bit
        for all B'10bit
```

```
            RGBmax = max(R'10bit, G'10bit, B'10bit)
            RGBmin = min(R'10bit, G'10bit, B'10bit)
            if (likelyBigDifference(RGBmax, RGBmin))
                1bit2DLUT(RGBmax, RGBmin) = 1
            end
        end
    end
end
```

This 2D-lut needs only $2^{10+10}$ one-bit entries, which means $2^{10+10}/8$ bytes, which equals $2^{10+10-3}=2^{17}$ bytes=128 KB.

An example of likelyBigDifference(RGBmax,RGBmin) is RGBmax/(RGBmin+s)>t, where s is a constant, such as 0.1, and t is a threshold.

In a 9th embodiment, a first round of processing may select some pixels as being marked for the Ajusty processing chain, with any of the methods presented herein. In a second round of processing, one may select pixels that are neighbors to pixels that were marked in the first round. The Ajusty processing chain will then be carried out for pixels selected in either the first or the second round.

In a 10th embodiment, a more exact value for Y' is obtained than is possible with the binary search version of the Ajusty processing chain described in Annex A. A binary search works by reducing the size of an interval, typically by cutting it in half. As a start, the interval is set to cover all possible values of Y', for instance [64, 940], or [0, 1023]. Next, a candidate Y' value is selected as the middle point of this interval, for instance Y'candidate=floor((0+1023)/2)= 511. When we try this candidate value, we will get a Y value. If the Y-value obtained is larger than the target value $Y_0$, then Y'candidate was too big, and we can deduce that all values larger than 511 are ruled out. Hence the interval is reduced to [0, 511]. A new candidate value floor((0+511)/2)=255 is selected, and perhaps this time the Y produced is smaller than the target value $Y_0$. We can then deduce that the correct Y' must lie in the interval [255, 511]. And so the method proceeds until, after 10 steps, we have an interval that is only one step wide. Assume for instance that the optimal Y' with fractional precision is 347.03. Then the interval after 10 iterations will be [347, 348]. However, we still don't know if 347 is better than 348. Therefore in one embodiment of the proposed solution, both the numbers 347 and 348 are tried. Assume that setting Y' to 347 produces $Y_{347}$, and that setting Y' to 348 produces $Y_{348}$. We can then see which one is best by calculating the errors e1=$(Y_0-Y_{347})^2$ and e2=$(Y_0-Y_{348})^2$. If e1<e2, we use Y'=347, otherwise we use Y'=348. This way we can further reduce the error in Y compared to just using, say, the lowest value in the interval [a,b]. Note that this method is actually better than knowing the optimal Y' with fraction precision and rounding it to the closest integer. Due to the non-linearity of the equations used to produce a Y from Y', Cb and Cr, it may not be optimal to just round. As an example, even if the optimal Y' with fractional precision is 347.6, it may be advantageous to select 347 even though 348 is the closest integer. Using the above approach of calculating e1 and e2 will in this case select 347, which is correct.

In summary, assume Cb10bit is the Cb-value quantized to 10 bits, Cr10bit is ditto for Cr, and that $Y_0$ is the correct luminance value that we want to achieve. Then the above method can be carried out with the following pseudo code:

```
a = 0
b = 1023
[a, b] = performBinarySearch(a, b, Y_O, Cb10bit, Cr10bit, 10)
Ya = calcY(a, Cb10bit, Cr10bit)
Yb = calcY(b, Cb10bit, Cr10bit)
e1 = (Ya - Y_O)^2
e2 = (Yb - Y_O)^2
if(e1 < e2)
    use Y' = a
else
    use Y' = b
end
``` where performBinarySearch(a, b, $Y_0$, Cb10bi, Cr10bit, N) performs binary search in the way described above in N steps, and outputs the final interval to [a,b]. After N=10 times b will be equal to a+1. calcY(Y', Cb, Cr) calculates the linear luminance Y from the values Y', Cb and Cr as described in the Ajusty processing chain in Annex A and reiterated here for the convenience of the reader:

$$R'=Y'+1.47460 \times Cr$$

$$G'=Y'-0.16455 \times Cb-0.57135 \times Cr$$

$$B'=Y'+1.88140 \times Cb. \quad \text{(equation 7)}$$

$$R=TF(R')$$

$$G=TF(G')$$

$$B=TF(B')$$

$$Y=0.262700 \times R+0.677998 \times G+0.059302 \times B$$

In an 11th embodiment, the Ajusty processing chain is only calculated if the R, G, and B color components all fall within a certain criteria defined by a set of functions. These functions could be derived and illustrated by plotting the samples for which Y' would need to be calculated using the Ajusty processing chain in a cube where R, G and B are the axes of the 3D plot. The functions would then be planes, of the form aR+bG+cB>d, or non-linear surfaces through the cube dividing the samples that would not need to be calculated with Ajusty processing chain from the rest of the samples. In other versions of this embodiment other color representations are used, e.g. R'G'B' or Y'CbCr.

In a 12th embodiment, we take advantage of the fact that the ideal Y' for a color with chrominance Cb Cr and desired linear luminance $Y_0$ may not be so different from the ideal Y' of a color with a neighboring chrominance Cb+d1, Cr+d2 and neighboring desired luminance $Y_0$+d3. As an example, we may conclude that in a neighborhood (d1, d2, d3) to such a color, all ideal Y' lie in a small interval [a0, b0]. We can then do binary search in this small interval [a0, b0] instead of doing binary search in the much larger interval [0, 1023]. In this way we can reduce the number of binary search iterations.

In a 13th embodiment, we take advantage of this fact by creating two look-up tables for a0 and b0. The first LUT, called startLUT, is used to find the start of the interval to search, and the second LUT, called stopLUT, is used to find the stop of the interval to search. As an example, it is possible to quantize Cb, Cr and Ynonlinear to six bits. The startLUT can then be created by iterating over all triplets (Cb, Cr and $Y_0$) that quantize to the same LUT position, and store the minimum interval starting point in that position:

```
startLUT(a, b, c) = 1023 for all values a, b, c
stopLUT(a, b, c) = 0 for all values a, b ,c
for all Cb10bit from 0 to 1023
    for all Cr10bit from 0 to 1023
        for all Ynonlinear from 0 to 1023
            Y_O = TF-1(Ynonlinear/1023)
            Cb = calcCbfromCb10bit(Cb10bit)
            Cr = calcCrfromCr10bit(Cr10bit)
            Y' = calcY(Y_O, Cb, Cr)
            Y__6bits = Ynonlinear >> 4
            Cb__6bits = Cb10bits >> 4
            Cr__6bits = Cr10bits >> 4
            if( Y' < startLUT(Y__6bits, Cb__6bits, Cr__6bits)
                startLUT(Y__6bits, Cb__6bits, Cr__6bits) = Y'
            end
            if( Y' > stopLUT(Y__6bits, Cb__6bits, Cr__6bits)
                stopLUT(Y__6bits, Cb__6bits, Cr__6bits) = Y'
            end
        end
    end
end
```

Here calcCbfromCb10bit can be done according to B.1.5.7 in [5], and ditto for calcCrfromCr10bit.

After having created these two LUTs, the calculation of the best Y' can be carried out using the following pseudo code:

```
Y__6bits = (1023 * TF(Y_O)) >> 4
Cb__6bits = Cb10bit >> 4
Cr__6bits = Cr10bit >> 4
a = startLUT(Y__6bits, Cb__6bits, Cr__6bits)
b = stopLUT(Y__6bits, Cb__6bits, Cr__6bits)
[a, b] = performBinarySearch(a, b, Y_O, Cb10bit, Cr10bit,
ceil(log(b-a)/log(2)))
Ya = calcY(a, Cb10bit, Cr10bit)
Yb = calcY(b, Cb10bit, Cr10bit)
e1 = (Ya - Y_O)^2
e2 = (Yb - Y_O)^2
if(e1 < e2)
    use Y' = a
else
    use Y' = b
end
```

We see that instead of carrying out the binary search 10 times for every pixel, we carry out ceil(log(b−a)/log(2)) iterations, where ceil rounds a number to the next larger integer. As an example, if the interval found in the lookup tables is [a,b]=[340, 347], then b−a=347−340=7, and since log(7)/log(2)=2.81, ceil(log(b−a)/log(2))=3. We thus only need to do three iterations instead of 10. Assume that in the average case only three iterations are needed. In that case the conversion time will be roughly 5×*(3/10)=1.5×. The full conversion time is then a factor 11.5/11=1.045 larger than the anchor conversion time, or 4.5% more time, instead of 36% more time. This is a considerable savings.

Yet the size of the two LUTs are not so great. Since only 6 bits are used, each table only needs $2^{6+6+6}=2^{18}$ entries. Since we need two such tables and each entry is two bytes, we need $4 \times 2^{18}=2^{2+18}=2^{20}=1$ MB of data. That is considerably less than the 2 GB that were needed in the previous art.

It may be possible to use other sizes than 6 bits. It may also be possible to use different quantization on the different parameters. As an example, it may be possible to use 5 bits for Cb and Cr and 8 bits for Ynonlinear.

In a 14th embodiment, the estimation of the Ajusty processing chain is based on knowledge of the optimal Y' from a previous picture. For example the range of the possible Y' values can be estimated from a previous picture and used as in the current picture. If some of the end points is selected the search can be refined for the range below or the range above pending on the position of the best Y' from the search in the first range.

In a 15th embodiment, the estimation of the Ajusty processing chain is based on knowledge of the optimal Y' from one or more spatially neighboring samples. For instance, the average of the optimal Y' for one or more of the already processed neighboring samples could be used to determine a local starting range to perform a binary search for the current sample. A starting range [avg−$2^L$, avg+$2^L$+1] for the binary search could then be selected. If some of the end points is selected the search can be refined for the range below or the range above pending on the position of the best Y' from the search in the first range. L is preferably chosen to minimize the average number of iterations needed to find the optimal Y' for a current sample.

As an example, assume that for a 10 bit picture the neighbors of the current sample with position x has the following optimal Y' values, $Y'_{x-1}$=341 and $Y'_{x+1}$=353. The average of these optimal Y' values are avg=347. If for instance L=3 then L+1=4 iterations are needed to find the optimal Y' if the optimal Y' is within [340, 355]. If 339 or 356 is selected then the below or above range should be searched to find the optimal Y' for the sample.

In a 16th embodiment, the estimation of the Ajusty processing chain is performed in a first pass for a limited number of samples for example for every second sample horizontally and every second sample vertically, see FIG. 12A. Then the Ajusty processing chain is performed in a second pass for remaining samples inbetween the samples of the first pass based on knowledge of optimal Y' from one or several neighboring samples from the first pass and one or several neighboring samples from already determined optimal Y' in the second pass, see FIG. 12B.

As an example if the max value from the first pass is Y'max and the min value from the first pass in Y'min the first sample to be processed in the second pass can use Y'max and Y'min to determine the range for the search of the optimal Y' for that sample. If some of the end points is selected the search can be refined below or above the best Y' value pending on the position of the best Y'. Then the Y'max and Y'min is updated based on optimal Y' before next sample in the second pass is determined. This repeats until all second pass samples have been determined In a 17th embodiment, only the samples with linear luminance error, when the Ajusty processing chain is not used, larger than a threshold are adjusted by the Ajusty processing chain. The threshold can be based on knowledge from a previous picture.

In a 18th embodiment, only the samples with linear luminance error larger than a threshold are adjusted by the Ajusty processing chain, where the threshold is based on the average luminance error obtained by omitting the subsampling and upsampling of chroma components.

In a 19th embodiment, only the samples with linear luminance error larger than a threshold are adjusted by the Ajusty processing chain, where the threshold is based on the average luminance error for a previous picture after the Ajusty processing chain has been applied to that picture.

In a 20th embodiment, only the samples with a linear luminance larger than a threshold are adjusted by the Ajusty processing chain. If the pixels are too dark, the difference is simply not visible and there is no need to improve the quality using the Ajusty processing chain.

In a 21th embodiment, a computation cache is used. As an example, assume the first pixel in the image has the value Ynonlinear10 bit=200, Cb=300 and Cr=400. The correct Y' is then calculated using the Ajusty processing chain. Also, the result is stored in a cache, and a hash-value is created, for example by performing bit-wise XOR on the last eight bits of the three values:

HASH=(200 AND 255)XOR(300 AND 255)XOR (400 AND 255)=116.

The hash-value is stored together with the parameter (Ynonlinear10 bit=200, Cb=300 and Cr=400), and the calculated Y'-value in the cache. Assume that the next pixel also has the value Ynonlinear10bit=200, Cb=300 and Cr=400. First, the hash value is calculated:

HASH=(200 AND 255)XOR(300 AND 255)XOR (400 AND 255)=116.

We now check the cache to see if this hash value matches any entries. We see that it does match the value we just put in. Next we make sure that this is actually the correct value by checking that all three parameters match, which they do. Finally, we get the stored Y'-value from the cache. In this way, we do not need to calculate the Y'-value for the second pixel, which saves computation.

A person skilled in the art will realize that it is possible to combine one or more of the above described embodiments, even for cases where it says "only the samples with . . . ". For example, it would be possible to apply one threshold related to the linear luminance in combination with a threshold related to luminance error obtained by omitting the subsampling and upsampling of chroma components.

It should also be noted that it is possible that not all pixel values will be treated according to the same rules, e.g. pixels with large values in all RGB components might be excluded from further testing.

Even though the embodiments described above relate to a fast way of calculating the optimal Y' primarily using the Ajusty processing chain, a person skilled in the art would understand that it is possible to use some of the methods or variations of the methods described above to in a fast way derive other optimal pixel properties such as pixel values from de-noising, blur or sharpen or the output from other image filters or other pixel conversions.

Another example of optimal pixel properties that could be derived are the optimal Cb and Cr values after the optimal Y' has been found in the RGB 4:4:4 to Y'CbCr 4:2:0 conversion. How to find the best Cb and Cr using the Ajustc processing chain is described in Annex C. The Ajustc processing chain is here described in short for the convenience of the reader. Instead of doing the conversion as in the anchor processing chain:
RGB 4:4:4→R'G'B'4:4:4→Y'CbCr 4:4:4-subsampling-of-Cb-and-Cr→Y'CbCr 4:2:0,
where the subsampling from 4:4:4 to 4:2:0 is done in the last step of the anchor processing chain, the Ajustc processing chain uses:
RGB 4:4:4-subsampling-of-R-G-and-B→RGB 2:2:2→R'G'B'2:2:2→Y'CbCr 2:2:2
where the subsampling instead is the first part of the Ajustyc processing chain. Here we have used the term 2:2:2 to indicate that all three samples are at half resolution in both the x- and y-dimension. In this way, we do not get a full-resolution Y' component, since the Y' component in the last step is 2:2:2, i.e. half resolution in both directions. This problem is overcome by the following processing steps:
RGB 4:4:4→XYZ 4:4:4→Y 4:4:4--------------------------------+-----→Y'=AJUSTY(Y 4:4:4, CbCr 4:4:4)
Y'CbCr 2:2:2→CbCr 2:2:2-upsample→CbCr4:4:4---------/

In short, the target luminance Y 4:4:4 is found by converting RGB 4:4:4 to XYZ 4:4:4 and then use Y and the chroma from Y'CbCr 2:2:2 after upsampling CbCr to same resolution as Y, with the Ajusty processing chain to find the best Y'. Alternatively, the anchor processing chain could instead be used to derive the luma component Y'.

Using for instance one of the LUT approaches in the embodiments above it could be possible to determine that the Cb and Cr values do not need to be calculated using the Ajustc processing for a certain sample. Moreover, in case it is determined that there is no need to find the optimal Y' for a certain sample according to any of the embodiments above, then the Ajustc processing chain is not needed either for that sample.

FIG. 13A depicts a case where we have calculated both Y'anchor and Y'ajusty, and calculated the difference between them. Gray equals zero difference, whereas white or black equals a great difference. As can be seen only a few pixels are far from zero. Only 4.4% of the pixels have a greater difference between Y'anchor and Y'ajusty than two steps.

Figure 13B:
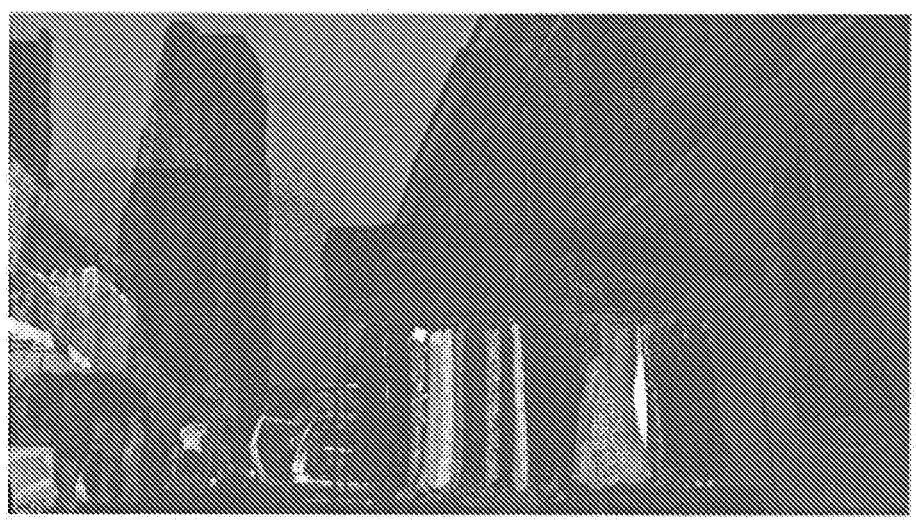
FIG. 13B schematically illustrate the quotient of maxRGB/(minRGB+s) for the picture shown in FIG. 13A.

FIG. 13B depicts an image where for each pixel, maxRGB=max(R, G, B) and minRGB=min (R, G, B) are calculated. Then an image is created using maxRGB/(minRGB+0.1) in each pixel. This image is then scaled between 0 and 1 by dividing by the largest value. Finally the value x for each pixel is replaced by $x^{0.25}$, to increase visibility. As can be seen in the image, the white areas in FIG. 13B, i.e. large value of maxRGB/(minRGB+0.1), correspond well with the areas where Y'anchor differ from Y'ajusty in FIG. 13A.

Accordingly, performing the decision between the default and auxiliary processing chain based on the minimum color component value for a pixel and in particular a quotient between the maximum and minimum color component value identifies those pixels in a picture that would benefit from using the auxiliary processing chain and those pixels that the auxiliary processing chain does not lead to any significant visual improvements over the anchor processing chain.

Generally, visual artifacts only arises when the color of a pixel is close to the gamut boundary, i.e. when at least one of the color components R, G or B is small. Thus, it is safe to avoid the expensive computation if the minimum value is larger than some "safe" value.

The optional inclusion of the maximum value is really there for the sake of visual perception. If we have a very dark pixel, such as RGB=(1, 0.01, 0.2), it is possible to have horrible artifacts in that pixel, but the pixel will anyway be so dark that one cannot see it. The "visibility" of a pixel, i.e. how visible a pixel is, is determined by the luminance $Y=w_R R+w_G G+w_B B$, which in turn is mainly dependent on the maximum value of the RGB color components. Hence, if the maximum value is very small, then also the luminance value Y will be small.

A further aspect of the embodiments relates to a device for pre-processing a pixel in a picture. The device is configured to determine, based on a minimum color component value for the pixel, whether a default processing chain is used to derive a luma component value, a first subsampled chroma component value and a second subsampled chroma component value or whether an auxiliary processing chain is used to derive at least one of the luma component value, the first subsampled chroma component value and the second subsampled chroma component value.

In an embodiment, the device is configured to select the auxiliary processing chain if the minimum color component value is below a threshold value and otherwise selecting the default processing chain.

In an embodiment, the device is configured to determine, based on the minimum color component value and a maximum color component value for the pixel, whether the default processing chain is used to derive the luma component value, the first subsampled chroma component value and the second subsampled chroma component value or whether the auxiliary processing chain is used to derive the at least one of the luma component value, the first subsampled chroma component value and the second subsampled chroma component value.

In an embodiment, the device is configured to determine, based on a quotient between the maximum color component value or a weighted version thereof and 1) the minimum color component value or a weighted version thereof, or 2) a sum of the minimum color component value or the weighted version thereof and a constant, whether the default processing chain is used to derive the luma component value, the first subsampled chroma component value and the second subsampled chroma component value or whether the auxiliary processing chain is used to derive the at least one of the luma component value, the first subsampled chroma component value and the second subsampled chroma component value.

In an embodiment, the device is configured to select the auxiliary processing chain if the quotient exceeds a threshold value and otherwise selecting the default processing chain.

In a particular embodiment, the device is configured to calculate a function value as $$\frac{max}{min+s},$$

wherein max represents the maximum color component value or the weighted version thereof, min represents the minimum color component value or the weighted version thereof and s is the constant. The device is also configured to compare the function value with the threshold value.

In an embodiment, the device is configured to input color component values for the pixel in a look-up table configured to output a first value if the quotient exceeds a threshold value and otherwise output a second value. The device is also configured to select the auxiliary processing chain if a value output from the look-up table is equal to the first value. The device is further configured to select the auxiliary processing chain if the value output from the look-up table is equal to the second value.

In an embodiment, the device is configured to derive the first subsampled chroma component value and the second subsampled chroma component value using the default processing chain. The device is configured to determine, based on the minimum color component value, whether the default processing chain is used to derive the luma component value or whether a first auxiliary processing chain is used to derive the luma component value.

In another embodiment, the device is configured to derive the luma component value using the default processing chain. The device is configured to determine, based on the minimum color component value, whether the default processing chain is used to derive the first subsampled chroma component value and the second subsampled chroma component value or whether a second auxiliary processing chain is used to derive the first subsampled chroma component value and the second subsampled chroma component value.

In a further embodiment, the device is configured to determine, based on the minimum color component value, whether the default processing chain is used to derive the luma component value, the first subsampled chroma component value and the second subsampled chroma component value or whether a first auxiliary processing chain is used to derive the luma component value and a second auxiliary processing chain is used to derive the first subsampled chroma component value and the second subsampled chroma component value.

In an embodiment, the device is configured, according to the default processing chain, to apply a first transfer function to a linear color in a first color space to obtain a non-linear color in the first color space. The device is also configured, according to the default processing chain, to apply a first color transform to the non-linear color in the first color space to obtain the luma component value and two chroma component values in a second color space. The device is further configured, according to the default processing chain, to subsample the two chroma component values in the second color space to obtain the first subsampled chroma component value and the second subsampled chroma component value in the second color space. This embodiment corresponds to pre-processing the pixel according to the default processing chain.

In an embodiment, the device is configured, according to the first auxiliary processing chain to obtain an original linear luminance component value of the pixel in a third color space determined based on a linear color of the pixel in a first color space. The device is also configured, according to the first auxiliary processing chain, to derive the luma component value in a second color space based on two chroma component values in the second color space and the original linear luminance component value in the third color space. This embodiment corresponds to pre-processing the pixel according the Ajusty processing chain.

In an embodiment, the device is configured, according to the second auxiliary processing chain, to subsample a linear color in a first color space to obtain a subsampled linear color in the first color space. The device is also configured, according to the second auxiliary processing chain, to apply a first transfer function to the subsampled linear color in the first color space to obtain a subsampled non-linear color in the first color space. The device is further configured, according to the second auxiliary processing chain, to apply a first color transform to the subsampled non-linear color in the first color space to obtain the first subsampled chroma component value and the second subsampled chroma component value in a second color space. This embodiment corresponds to pre-processing the pixel according to the Ajustc processing chain.

According to a second aspect a unit, such as a pre-processor or an encoder, is provided. The unit is configured to determine for which pixels the anchor processing chain can be used and for which pixels the Ajusty processing chain can be used. The unit is configured to perform the determination according to any of the embodiments below or a combination thereof.

FIG. 14 illustrates a particular hardware implementation of a device 100 according to the embodiments. In an embodiment, the device 100 comprises a determining unit 101 configured to determine for which pixels the anchor processing chain can be used and for which pixels the auxiliary processing chain, i.e. Ajusty and/or Ajustc processing chain, can be used. The determining unit 101 is configured to do the determination according to any of the disclosed embodiments or a combination thereof. The device 100 also comprises a deriver 102 configured to derive a corrected Y' according to the Ajusty processing chain and/or a corrected CbCr according to the Ajustc processing chain. The device 100 further comprises a video encoder 103 configured to encode a picture.

In an embodiment, the device 100 also comprises an input unit 104 configured to receive the pictures of a video sequence to be encoded and an output unit 105 configured to output an encoded bitstream.

The input unit 104 could be in the form of a general input unit, in particular in the case of a wired connection to external devices. Alternatively, the input unit 104 could be in the form of a receiver or transceiver, in particular in the case or a wireless connection to external devices. Correspondingly, the output unit 105 could be in the form of a general output unit, in particular in the case of a wired connection to external devices. Alternatively, the output unit 105 could be in the form of a transmitter or transceiver, in particular in the case or a wireless connection to external devices The input unit 104 is preferably connected to the determining unit 101, the deriver 102 and the video encoder 103 to forward the video to be encoded thereto. The determining unit 101 is preferably connected to the deriver 102 and the video encoder 103. The video encoder 103 is preferably connected to the output unit 105 to forward the encoded bitstream to a decoder.

Alternatively, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

In an embodiment, the device 110 for pro-processing a pixel in a picture, see FIG. 15, comprises a processor 111 and a memory 112 comprising instructions executable by the processor 111. The processor 111 is operative to determine, based on the minimum color component value, whether the default processing chain is used to derive the luma component value, the first subsampled chroma component value and the second chroma component value or whether the auxiliary processing chain is used to derive the at least one of the luma component value, the first subsampled chroma component value and the second subsampled chroma component value.

In a particular example, the device 110, see FIG. 15, comprises a processor 111 and a memory 112 comprising instructions executable by the processor 111. The processor 111 is operative to determine for which pixels the anchor processing chain can be used and for which pixels the Ajusty and/or Ajustc processing chain can be used according to any of the disclosed embodiments or a combination thereof. Furthermore, the processor 111 may be operative to derive a corrected Y' according to the Ajusty processing chain, a corrected CbCr according to the Ajustc processing chain and to encode a picture.

In an embodiment, the device 110 also comprises an input unit 113 configured to receive the video with pictures to be encoded. In such a case, the processor 111 is operative to receive the video to be encoded from the input unit 113.

In an embodiment, the device 110 also comprises an output unit 114 configured to output encoded bitstream as received from the processor 111.

In a particular embodiment, the processor 111 is operative, when executing the instructions stored in the memory 112 to perform the above described operations. The processor 111 is thereby interconnected to the memory 112 to enable normal software execution.

Another aspect of the embodiments relates to a device 110 for encoding a pixel in a picture. The device 110 comprises a processor 111 and a memory 112 comprising instructions executable by the processor 111. The processor 111 is operative to determine, based on the minimum color component value, whether the default processing chain is used to derive the luma component value, the first subsampled chroma component value and the second chroma component value or whether the auxiliary processing chain is used to derive the at least one of the luma component value, the first subsampled chroma component value and the second subsampled chroma component value. The processor 111 is also operative to derive the luma component value, the first subsampled chroma component value and the second subsampled chroma component value according to default processing chain or the least one of the luma component value, the first subsampled chroma component value and the second subsampled chroma component value according to the auxiliary processing chain. The processor 111 is further operative to encode the luma component value, the first subsampled chroma component value and the second chroma component value.

The components of FIG. 15 are depicted as single boxes located within a single larger box. In practice however, device 110 may comprise multiple different physical components that make up a single illustrated component, e.g. input unit 113 may comprise terminals for coupling wires for a wired connection and a radio transceiver for a wireless connection. Similarly, device 110 may be composed of multiple physically separate components which may each have their own respective processor, memory, and interface components. In certain scenarios in which device 110 comprises multiple separate components, one or more of the separate components may be shared among several devices. For example, a single memory unit 112 may be shared by multiple devices 110.

The processor 111 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other device components, such as memory 112. For example, the processor 111 may execute instructions stored in the memory 112. Such functionality may include providing various encoding or decoding features and/or any of the other features or benefits disclosed herein.

The memory 112 may comprise any form of volatile or non-volatile computer readable memory including, without limitation, persistent memory, solid state memory, remotely mounted memory, magnetic media, optical media, random access memory (RAM), read-only memory (ROM), removable media, or any other suitable local or remote memory component. The memory 112 may store any suitable instructions, data or information, including software and encoded logic, utilized by the device 110. The memory 112 may be used to store any calculations made by the processor 111 and/or any data received via the I/O interfaces 113, 114.

The device 110 also comprises an input unit 113 and an output unit 114 (I/O interfaces), which may be used in the wired or wireless communication of video and/or data to and from the device 110. The I/O interfaces may include a radio transmitter and/or receiver that may be coupled to or a part of an antenna. The radio may receive video that is to be encoded or decoded.

Figure 16:
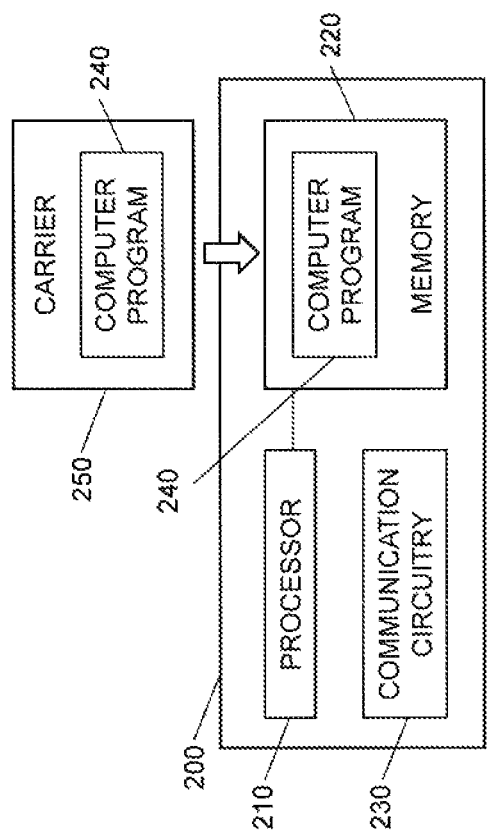
FIG. 16 is a schematic illustration of a user equipment according to an embodiment.

FIG. 16 is a schematic block diagram illustrating an example of a user equipment (UE) 200 comprising a processor 210, an associated memory 220 and a communication circuitry 230.

In this particular example, at least some of the steps, functions, procedures, modules and/or blocks described herein are implemented in a computer program 240, which is loaded into the memory 220 for execution by a processing circuitry including one or more processors 210. The processor 210 and memory 220 are interconnected to each other to enable normal software execution. A communication circuitry 230 is also interconnected to the processor 210 and/or the memory 220 to enable input and/or output of video data and encoded video data.

The user equipment 200 can be any device or apparatus that can receive and process video data. For instance, the user equipment 200 could be a computer, either stationary or portable, such as laptop, a smart phone, a tablet, a set-top box, etc.

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

A further aspect of the embodiments relates to a computer program 240 comprising instructions, which when executed by a processor 210, cause the processor 210 to determine, based on a minimum color component value for a pixel in a picture, whether a default processing chain is used to derive a luma component value, a first subsampled chroma component value and a second subsampled chroma component value or whether an auxiliary processing chain is used to derive at least one of the luma component value, the first subsampled chroma component value and the second subsampled chroma component value.

In an embodiment, the computer program 240 further comprises instructions, which when executed by the processor 210, cause the processor 210 to derive the luma component value, the first subsampled chroma component value and the second subsampled chroma component value according to default processing chain or the least one of the luma component value, the first subsampled chroma component value and the second subsampled chroma component value according to the auxiliary processing chain. The processor 210 is also caused to encode the luma component value, the first subsampled chroma component value and the second chroma component value.

In an embodiment, the computer program 240 comprises instructions, which when executed by the processor 210, cause the processor 210 to determine for which pixels the anchor processing chain can be used and for which pixels the Ajusty processing chain can be used. The processor is configured to do the determination according to any of the embodiments below or a combination thereof.

The proposed technology also provides a carrier 250 comprising a computer program 240. The carrier 250 is one of an electronic signal, an optical signal, an electromagnetic signal, a magnetic signal, an electric signal, a radio signal, a microwave signal, or a computer-readable storage medium 250.

By way of example, the software or computer program 240 may be realized as a computer program product, which is normally carried or stored on a computer-readable medium 240, preferably non-volatile computer-readable storage medium 250. The computer-readable medium 250 may include one or more removable or non-removable memory devices including, but not limited to a Read-Only Memory (ROM), a Random Access Memory (RAM), a Compact Disc (CD), a Digital Versatile Disc (DVD), a Blue-ray disc, a Universal Serial Bus (USB) memory, a Hard Disk Drive (HDD) storage device, a flash memory, a magnetic tape, or any other conventional memory device. The computer program 240 may thus be loaded into the operating memory of a computer or equivalent processing device, represented by the user equipment 200 in FIG. 16, for execution by the processor 210 thereof.

The flow diagram or diagrams presented herein may therefore be regarded as a computer flow diagram or diagrams, when performed by one or more processors. A corresponding device may be defined as a group of function modules, where each step performed by the processor corresponds to a function module. In this case, the function modules are implemented as a computer program running on the processor. Hence, the device may alternatively be defined as a group of function modules, where the function modules are implemented as a computer program running on at least one processor.

The computer program residing in memory may thus be organized as appropriate function modules configured to perform, when executed by the processor, at least part of the steps and/or tasks described herein. An example of such function modules is illustrated in FIG. 17.

Figure 17:
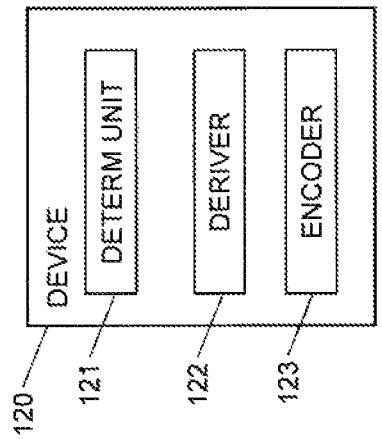
FIG. 17 is a schematic illustration of an implementation of a device according to the embodiments with function modules.

FIG. 17 is a schematic block diagram of a device 120 with function modules. In an embodiment, the device 120 for pre-processing a pixel in a picture comprises a determining unit 121 for determining, based on a minimum color component value for the pixel, whether a default processing chain is used to derive a luma component value, a first subsampled chroma component value and a second subsampled chroma component value or whether an auxiliary processing chain is used to derive at least one of the luma component value, the first subsampled chroma component value and the second subsample dchroma component value. The device 120 also comprises a deriver 122 for deriving the luma component value, the first subsampled chroma component value and the second subsampled chroma component value according to default processing chain or the least one of the luma component value, the first subsampled chroma component value and the second subsampled chroma component value according to the auxiliary processing chain.

In another embodiment, the device 120 comprises a determining unit 121 configured to determine for which pixels the anchor processing chain can be used and for which pixels the Ajusty processing chain can be used. The determining unit 121 is configured to do the determination according to any of the embodiments disclosed herein. The device 120 also comprises a deriver 122 configured to derive a corrected Y' The device 120 further comprises a video encoder 123 for encoding the bitstream using the corrected Y'.

Another aspect of the embodiments relates to a device 120 for encoding a pixel in a picture. The device 120 comprises a determining unit 121 for determining, based on the minimum color component value, whether the default processing chain is used to derive the luma component value, the first subsampled chroma component value and the second chroma component value or whether the auxiliary processing chain is used to derive the at least one of the luma component value, the first subsampled chroma component value and the second subsampled chroma component value. The device 120 also comprises a deriver 122 for deriving the luma component value, the first subsampled chroma component value and the second subsampled chroma component value according to default processing chain or the least one of the luma component value, the first subsampled chroma component value and the second subsampled chroma component value according to the auxiliary processing chain. The device 120 further comprises an encoder 123 for encoding the luma component value, the first subsampled chroma component value and the second chroma component value.

A further aspect of the embodiments relates to a user equipment comprising a device according to any of the embodiments disclosed herein and, for instance illustrated in FIGS. 14, 15 and 17. In an embodiment, the user equipment is selected from a group consisting of a computer, a laptop, a smart phone, a tablet and a set-top box.

Any steps described herein are merely illustrative of certain embodiments. It is not required that all embodiments incorporate all the steps disclosed nor that the steps be performed in the exact order depicted or described herein. Furthermore, some embodiments may include steps not illustrated or described herein, including steps inherent to one or more of the steps disclosed herein.

Any appropriate steps, methods, or functions may be performed through a computer program product that may, for example, be executed by the components and equipment illustrated in the attached figures. For example, the memory 112 in FIG. 15 may comprise computer readable means on which a computer program can be stored. The computer program may include instructions which cause the processor 111, and any operatively coupled entities and devices, such as input unit 113, output unit 114, and memory 112, to execute methods according to embodiments described herein. The computer program and/or computer program product may thus provide means for performing any steps herein disclosed.

Any appropriate steps, methods, or functions may be performed through one or more functional modules. Each functional module may comprise software, computer programs, sub-routines, libraries, source code, or any other form of executable instructions that are executed by, for example, a processor. In some embodiments, each functional module may be implemented in hardware and/or in software. For example, one or more or all functional modules may be implemented by a processor 111, see FIG. 15, possibly in cooperation with a memory 112. The processor 111 and the memory 112 may, thus, be arranged to allow the processor 111 to fetch instructions from the memory 112 and execute the fetched instructions to allow the respective functional module to perform any steps or functions disclosed herein.

It is becoming increasingly popular to provide computing services, such as hardware and/or software, in network devices, such as network nodes and/or servers, where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

Figure 18:
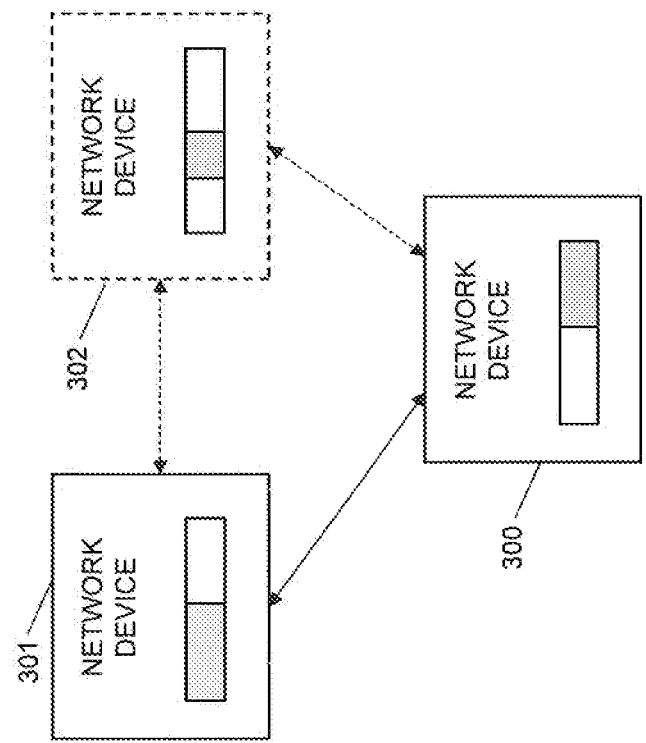
FIG. 18 schematically illustrate a distributed implementation of the embodiments among multiple network devices.

FIG. 18 is a schematic diagram illustrating an example of how functionality can be distributed or partitioned between different network devices 300, 301, 302 in a general case. In this example, there are at least two individual, but interconnected network devices 300, 301, which may have different functionalities, or parts of the same functionality, partitioned between the network devices 300, 301. There may be additional network devices 302 being part of such a distributed implementation. The network devices 300, 301, 302 may be part of the same wireless communication system, or one or more of the network devices may be so-called cloud-based network devices located outside of the wireless communication system.

Figure 19:
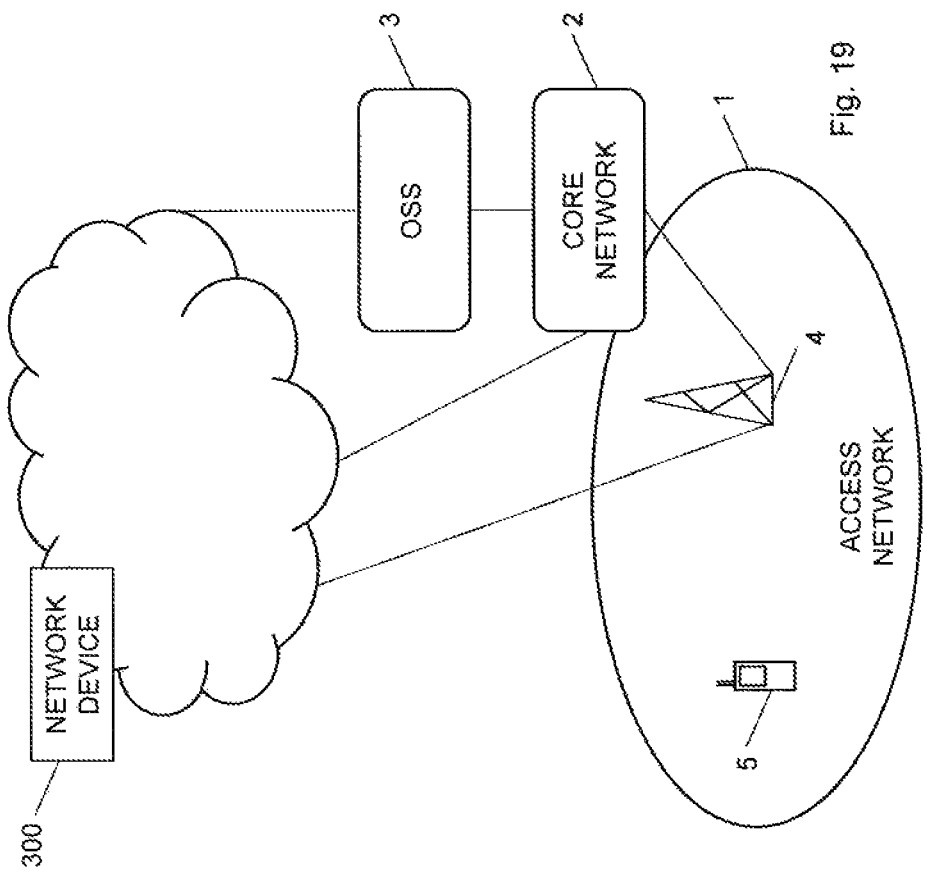
FIG. 19 is a schematic illustration of an example of a wireless communication system with one or more cloud-based network devices according to an embodiment.

FIG. 19 is a schematic diagram illustrating an example of a wireless communication system, including an access network 1 and/or a core network 2 and/or an Operations and Support System (OSS) 3 in cooperation with one or more cloud-based network devices 300. The figure also illustrates a network node 4 of the access network 1 and a user equipment 5 according to the embodiments.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and encoder or decoder systems and any feature from a particular figure disclosed in connection with other features may be applicable to any other figure and or combined with different features.

ANNEX A

The present Annex A comprises a description of the Ajusty processing chain that can be used according to the embodiments in order to derive a non-linear luma component value in the second color space.

A combination of a highly non-linear transfer function, 4:2:0 or 4:2:2 subsampling and non-constant luminance ordering gives rise to severe artifacts in saturated colors. An example is described in Annex B, where changes between two colors of similar luminance can result in a reconstructed image with very different luminances.

In a digital video signal, each component of a sample, i.e. pixel, is represented by an integer or floating point value. A display, such as screen, TV or monitor, that renders the video omits optical lights based on the digital values of the video signal. The function that translates the digital value V to optical light Y is the Electro-Optical-Transfer-Function (EOTF). Traditionally the EOTF has been expressed as an exponential function called a gamma function where the gamma γ is the exponent value. This is typically 2.4 (but can also be other values): $Y=V^\gamma$.

Using a gamma function works well for low luminance signals but when the luminance goes above 100 nits (cd/m²) the gamma function is not well aligned with the contrast sensitivity of the human visual system. Therefore transfer functions that are more non-linear are defined, e.g.:

$$Y = L_p \left( \frac{\max\left[\left(V^{\frac{1}{m}} - c_1\right), 0\right]}{c_2 - c_3 V^{\frac{1}{m}}} \right)^{\frac{1}{n}} \quad \text{(equation A1)}$$

$$n = \frac{2610}{4096} \times \frac{1}{4} \approx 0.15930176$$

$$m = \frac{2523}{4096} \times 128 = 78.84375$$

$$c_1 = c_3 - c_2 + 1 = \frac{3424}{4096} = 0.8359375$$

$$c_2 = \frac{2413}{4096} \times 32 = 18.8515625$$

$$c_3 = \frac{2392}{4096} \times 32 = 18.6875$$

$$L_p = 10000 \frac{\text{cd}}{\text{m}^2}$$

This transfer function is more non-linear than the gamma function in the sense that the maximum value of its first derivative over the range from 0 to 1 is larger than that of the gamma function.

Chrome subsampling is typically done before compression as an initial step to reduce the amount of data. In 4:2:2 the chroma signal is reduced to half the resolution in the vertical direction. In 4:2:0 the chroma signal is reduced to half the resolution in both the vertical direction and the horizontal direction. This is typically done with some filtering operation to get a good quality signal but can also be done using nearest neighbor.

In order to display a 4:2:0 or 4:2:2 video, a decoder performs upsampling of the chroma signal, which can be done using bilinear filters or longer filters.

However, a combination of a highly non-linear transfer function, 4:2:0 or 4:2:2 subsampling and non-constant luminance ordering gives rise to severe artifacts to the video data, in particular for saturated colors, i.e. colors close to the color gamut edge.

There are several ways to get around this problem. One ways is to not use 4:2:0 or 4:2:2 subsampling, but use 4:4:4 instead. That, however, is expensive, since 4:2:0 halves the number of bits prior to compression, whereas 4:2:2 reduces the number of bits to two-thirds. Another way is to not use a highly non-linear transfer function. However, that means that it is hard to represent content of very high peak brightness without having banding in dark regions. A third way is to use constant luminance, i.e. apply the transfer function after conversion to the CIE1931 XYZ color space. However, such a solution is not aligned with common practice within the broadcasting industry and might in some scenarios be difficult and expensive to realize.

A typical compression chain is described below. The incoming linear light pixel (R, G, B) ranging from 0 to 10,000 is first fed to the transfer function, which results in a new pixel (R', G', B') between 0 and 1.

After this, the pixel undergoes color transform resulting in Y'Cb'Cr'. Then the Cb' and Cr' components are subsampled to 4:2:0.

After decompression, the 4:2:0 sequences are upsampled to 4:4:4 again, inverse color space conversion gives (R', G', B') and finally inverse transfer function gives back the linear light pixel (R, G, B) that can be output on a monitor.

The trouble comes from the fact that the Cb' and Cr' components are interpolated, whereas the Y' component is not. Hence there can be a sharp shift in the Y' component in a pixel, but the Cb' and Cr' component cannot follow, since they are interpolated. For some colors, especially saturated colors, the result is a pixel of completely wrong intensity, and it is clearly visible.

It is proposed to change the Y' component in these cases so that the tuple (Y' Cb' Cr') generated from the interpolated colors is not so different from the original. Ideally the difference would be so small that it is not noticeable.

Basically it emanates to realizing that the Cb' and Cr' components are false, and then make also the Y' component false so that the (Y' Cb' Cr') are closer to the true colors. In other words, by introducing an error in Y' we can compensate for the errors already existing in Cb' and Cr' to come closer to the real pixel. It could be determined that the Cb' and Cr' components are false by comparing Cb'-Cb and Cr—Cr with a threshold by e.g. comparing the Cb' that you get from first subsampling chroma (4:2:0) then upsampling (to 4:2:4).

According to a first aspect an Ajusty method is provided. The method can be performed in an encoder or in a preprocess to the encoder. In the method, when it is determined that the Cb' and/or Cr' components include errors, a corrected Y' component is derived to compensate for the errors in the Cb' and/or the Cr' components.

According to a second aspect a unit, such as a preprocessor or an encoder, is provided. The unit is configured to determine that the Cb' and/or Cr' components include errors, and when it has determined that the Cb' and/or Cr' components include errors, it is configured to derive a corrected Y' component to compensate for the errors in the Cb' and the Cr' components.

The corrected Y' component can derived according to different embodiments as described below. Hence the corrected Y' component, Cb' and Cr' are then compressed resulting in that the image or video is perceived with a higher quality.

By changing the Y' component, i.e. deriving a corrected Y' component, we can compensate the resulting luminance value. The eye is much more sensitive to luminance changes than to chrominance changes, so the first rule must always be to make sure that the luminance does not deviate too much from the original value.

As described above, the non-linear luminance Y' is adjusted prior to compression so that the linear luminance Y of the pixel is closer to its correct value. This is further described below.

Assume a picture where the left part of the screen, e.g. pixels 0 to 96, has the value (2142, 0, 138) and that the right part, e.g. pixels 97 to 1920, has the value (2142, 4, 138). With a conventional processing chain we would get the results in Table A1.

TABLE A1

Data for the "worst" color for 4:2:0 subsampling

| Pixel no. 97 | RGB value | Y value | Y diff | relative error | Barten steps |
|---|---|---|---|---|---|
| original | 2142<br>4<br>138 | 573.5991 | 0 | 0 | 0 |
| RGB 4:4:4 | 2142.6617<br>3.9750<br>138.2966 | 573.7735 | 0.1745 | 0.0304% | 0.0691 |
| RGB 4:2:0* | 3993.733<br>2.4265<br>263.6030 | 1066.4311 | 492.8320 | 85.9192% | 195.2710 |

*This indicates values obtained by upsampling the subsampled color in 4:2:0 format Here, the Y value is the linear luminance. That is, the Y value of the original is the value you get when you take the original linear light RGB (2142, 4, 138) and convert it to XYZ. For example, if RGB is in the BT.2020 color space you can convert to XYZ using $$X = 0.636958 \times R + 0.144617 \times G + 0.168881 \times B$$

$$Y = 0.262700 \times R + 0.677998 \times G + 0.059302 \times B$$

$$Z = 0.000000 \times R + 0.028073 \times G + 1.060985 \times B \quad \text{(equation A2)}$$

This Y component is the luminance that the eye is most sensitive to. It should not be confused with the Y' component mentioned above, which depends nonlinearly on R, G and B.

As can be seen in Table A1, the Y value is grossly wrong for pixel 97 when using RGB 4:2:0 subsampling and upsampling. Note that in this example, no compression has taken place, only quantization to 10 bits, and yet the Y value has a relative error of 85%. Using Barten's model that predicts how large differences the eye can see, we see that this error is 195 Barten steps, or 195 times greater than what would be just noticeable.

If we look at Table A2, we can see what happens.

TABLE A2

Pixel 97 is very different before and after color subsampling

| 4:4:4 10 bits | 94 | 95 | 96 | 97 | 98 | 99 |
|---|---|---|---|---|---|---|
| Linear RGB in | 2142<br>0<br>138 | 2142<br>0<br>138 | 2142<br>0<br>138 | 2142<br>4<br>138 | 2142<br>4<br>138 | 2142<br>4<br>138 |
| Y'Cb'Cr' 4:2:0 10 bits | 284<br>650<br>867 | 284 | 284<br>641<br>855 | 422 | 422<br>575<br>771 | 422 |
| Y'Cb'Cr' after upsampling | 284<br>650<br>867 | 284<br>650<br>866 | 284<br>641<br>855 | 422<br>607<br>812 | 422<br>575<br>771 | 422<br>571<br>766 |
| Linear RGB out | 2151.71<br>0<br>138.2278 | 2119.42<br>0<br>138.2278 | 1794.94<br>0.0018<br>114.8210 | 3993.73<br>2.4265<br>263.6030 | 2142.66<br>3.9750<br>138.2966 | 1986.71<br>4.2102<br>127.3837 |

If we look at the Cb' component, it has the value 607, which is about halfway between 650, before the discontinuity, i.e. pixel 94, and 575, after the discontinuity, but the correct value is 575. The trouble is that the error not only affects the chrominance but also the luminance of the pixel, which becomes way too big. Our idea is to compensate this by changing the Y' component of the pixel. According to the embodiments we do not let the Y' component be 422 for the pixel, but selects the value 363 instead. In Table A3 we show the result.

TABLE A3

Pixel 97 is much more similar before and after color subsampling

| 4:4:4 10 bits | 94 | 95 | 96 | 97 | 98 | 99 |
|---|---|---|---|---|---|---|
| Linear RGB in | 2142<br>0<br>138 | 2142<br>0<br>138 | 2142<br>0<br>138 | 2142<br>4<br>138 | 2142<br>4<br>138 | 2142<br>4<br>138 |
| Y'Cb'Cr' 4:2:0 10 bits | 284<br>650<br>867 | 284 | 284<br>641<br>855 | 363 | 422<br>575<br>771 | 422 |
| Y'Cb'Cr' after upsampling | 284<br>650<br>867 | 284<br>650<br>866 | 284<br>641<br>855 | 363<br>607<br>812 | 422<br>575<br>771 | 422<br>571<br>766 |
| Linear RGB out | 2151.71<br>0<br>138.2278 | 2119.42<br>0<br>138.2278 | 1794.94<br>0.0018<br>114.8210 | 2145.11<br>0.7008<br>138.0825 | 2142.66<br>3.9750<br>138.2966 | 1986.71<br>4.2102<br>127.3837 |

We can now see that the new color is much more similar to its correct value. The green component has gone in the wrong direction, but only by 1.72 cd/m², but at the same time the red component has almost halved to its correct value, a movement of 1849 cd/m², and the blue component has changed in a similar fashion. In Table A4 we show what happens to the luminance.

TABLE A4

Data for the "worst" color for 4:2:0 subsampling after correction

| Pixel no. 97 | RGB value | Y value | Y diff | relative error | Barten steps |
|---|---|---|---|---|---|
| original | 212<br>4<br>138 | 573.5991 | 0 | 0 | 0 |
| RGB 4:4:4 | 2142.6617<br>3.9750<br>138.2966 | 573.7735 | 0.1745 | 0.0304% | 0.0691 |
| RGB 4:2:0* | 2145.11<br>0.7008<br>138.0825 | 572.1852 | 1.4139 | 0.2465% | 0.5602 |

*This indicates values obtained by upsampling the subsampled color in 4:2:0 format As is seen in Table A4, we get a much smaller error in the luminance Y. The relative error is 0.2465%, which is equivalent to 0.5602 Barten steps, i.e. not possible to see.

The error is now instead in the chrominance, but given the fact that the human visual system is less sensitive to errors in chrominance than in luminance, this is not much of a problem. In addition, there is going to be an error in chrominance anyway since it is subsampled. Also, one may change the Y' component to get a good trade-off between the error in luminance and the error in chrominance.

Furthermore, the change in chrominance may not even be noticeable—the only difference is that the green component is 0.7008 cd/m² instead of 3.9750 cd/m² but that is most likely dwarfed by the red component anyway, since it is 2145, almost a thousand times larger. Another way to see it is that the ratio between the green and the red components becomes 0.7008/2145.11=0.000327 instead of the correct 3.9750/2142.6617=0.001855. It is not clear that this slight shift in hue is possible to see for the human eye. Hence we have traded an error in luminance that is 200 times larger than what is just noticeable to an error in chrominance that is so small it might not be possible to see.

The nice thing is that the changed Y' value only affects the individual pixel. Hence no other pixel is sacrificed by changing the Y' component.

In an embodiment, the value Y' is not optimized for a specific value of Cb' and Cr'. Instead the Y' value is selected so that it minimizes the luminance error for some different values of Cb' and Cr' or for a range of Cb' and Cr' values. This can be done in scenarios where the chroma upsampling method is unknown.

One variant is to perform a specific number of chroma upsampling methods and then select the Y' value that minimizes the average squared error for the different upsampling methods. In another version, the Y' value is selected so that the worst case, i.e. largest error, is minimized.

Another variant is to use two or more neighboring values of Cb' and Cr' and use them directly to calculate the range of possible Cb' and Cr' values.

Figure 20:
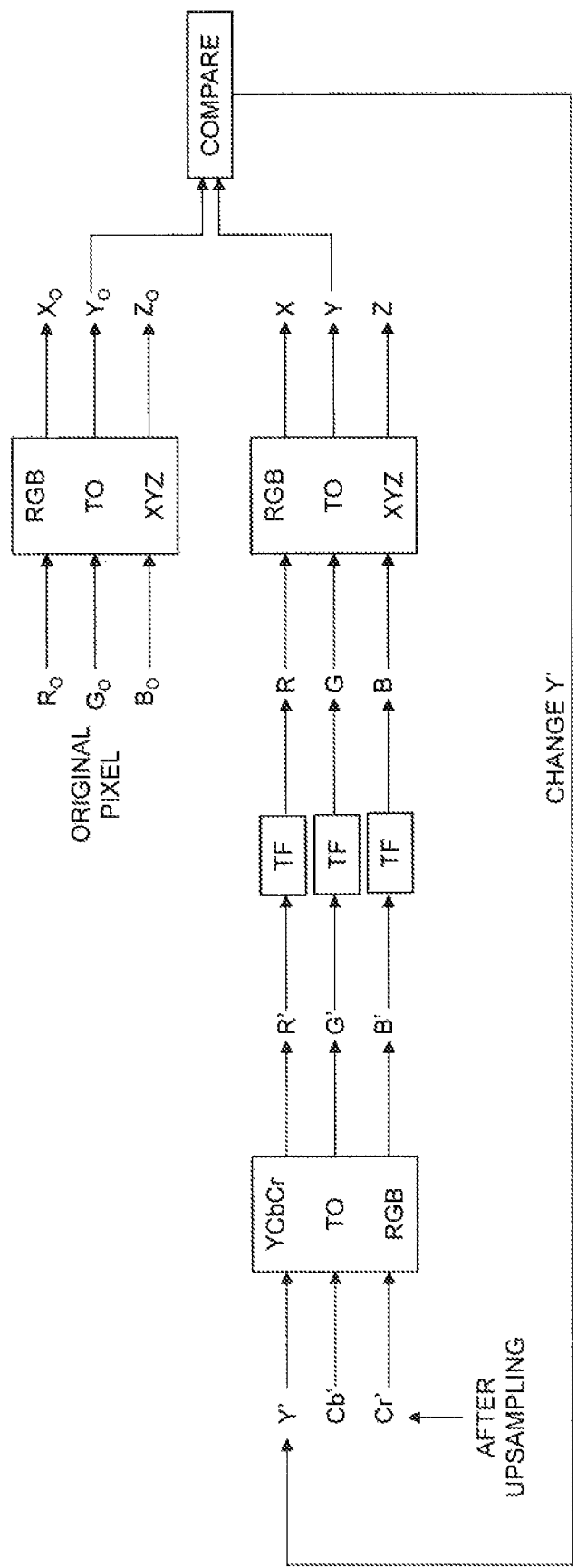
FIG. 20 illustrates an embodiment of deriving the corrected Y'.

There are several ways to find the best value for Y', we will go through a number of them. One way is shown in FIG. 20.

First we need to find the value $Y_0$ to optimize towards. The original pixel $R_0$, $G_0$, $B_0$ is transformed from RGB to XYZ as mentioned above. This results in $X_0$, $Y_0$, $Z_0$, of which we are only interested in $Y_0$. In fact, we do not need to calculate $X_0$ and $Z_0$. This $Y_0$ is the original luminance in linear light, and it is this that the eye is sensitive to. In our test case $Y_0$ is equal to 573.5991, see Table A1.

Second, we take our existing Y' value, together with the Cb' and Cr' values. In the case above, we would feed in (422, 607, 812), see Table A2. Now we would do a color transform from Y'Cb'Cr' to R'G'B'. This is done using $$R' = Y' + 1.47460 \times Cr'$$

$$G' = Y' - 0.16455 \times Cb' - 0.57135 \times Cr'$$

$$B' = Y' + 1.88140 \times Cb'. \quad \text{(equation A3)}$$

Next we invoke the transfer function. In this case we use the PQ-EOTF, which can be implemented using the following Matlab code, for instance:

function L=pq_eotf(c)

%%%
%%% c goes from 0.0 to 1.0
%%% L is output luminance in nits
%%%
c1=0.8359375;
c2=18.8515625;
c3=18.6875;
n=0.1593017578125;
m=78.84375;

c=max(c,0);

c=min(c,1);

L=10000*((max(c^(1/m)-c1,0)./(c2-c3*c^(1/m)))^(1/n));

The result is the color (R, G, B) in linear light. Now we convert this to XYZ as mentioned above, or really, we only need to calculate Y. This Y is the linear luminance of the pixel, and it is this luminance that we want to make as close as possible to $Y_0$. In our test case, Y starts out being 1066.4311, see Table A1.

Now we compare Y and $Y_0$. If Y is bigger than $Y_0$, we reduce our Y' value from 422 to something smaller. For instance, we can take one step and try 421. Then the entire calculation is carried out again, generating a new Y value. This is again compared to $Y_0$, and if it is still too big, we reduce Y' further. Finally, we will reach 363 and the resulting Y value, i.e. 572.1852 is now smaller than $Y_0$, i.e. 573.5991. The process now stops.

In the embodiment above it takes 422−363=59 iterations to reach the best value. This may be costly.

Therefore, an embodiment is to do a binary search to find the best Y' value. Optionally, first the maximum Y' value is tried, for instance 1023. Optionally, then the minimum Y' value is tried, for instance 0. Then a value in the middle is tried, for instance 512. If the Y value resulting from Y'=512 is larger than $Y_0$, we should search in the interval [0, 512]. If the Y-value is smaller than $Y_0$, we should instead search the interval [512, 1023]. We then proceed by calculating a new value in the middle of the selected interval, and proceeds until the interval only contains a single number, such as [363, 363], or [363, 364]. This is guaranteed to only take $\log_2(N)$ steps, where N is the number of possible values, which in this case is 1024. Hence only $\log_2(1024)=10$ steps are sufficient.

Yet another way to calculate the best value is to see FIG. 20 as an optimization problem and minimize the error $E=(Y-Y_0)^2$ with respect to Y'. This can be done by gradient descent, by calculating the gradient of E with respect to Y', i.e. dE/dY', and update Y' a small amount in the opposite direction of the gradient: $Y'_{n+1}=Y'_n-\alpha \times dE/dY'$, where $\alpha$ is a small constant.

Gradient descent can be slow, so a quicker way may be to use a second-order optimization algorithm that calculates or approximates the second order derivatives $d^2E/dY'^2$. Gauss-Newton is an example of such an algorithm.

In another embodiment the following process is applied in order to calculate Y':

X, $Y_0$ and Z are converted with a XYZ to RGB conversion to produce new values R1, G1 and B1

R1, G1 and B1 are converted with an inverse transfer function to produce R1', G1' and B1'.

R1, G1' and B1' are converted with an inverse color transform to produce Y'

In an embodiment, the Y' values of all pixels in an image or picture are corrected. In an alternate embodiment, only pixels that are at risk of having visible luminance errors are corrected. This may include pixels that are close to the color gamut edge, but exclude pixels closer to the middle of the color gamut triangle.

Looking at the bottom row in FIG. 20, the first step of processing is $$R'=Y'+1.47460 \times Cr'$$

$$G'=Y'-0.16455 \times Cb'-0.57135 \times Cr'$$

$$B'=Y'+1.88140 \times Cb'. \quad \text{(equation A3)}$$

But since Cr' and Cb' are fixed, they are interpolated, not sent, we can replace everything to the right of Y' with a constant $$R'=Y'+c1$$

$$G'=Y'+c2$$

$$B'=Y'+c3$$

The next step is taking the transfer function of the color components:

$$R=TF(R')$$

$$G=TF(G')$$

$$B=TF(B')$$

which then becomes $$R=TF(Y'+c1)$$

$$G=TF(Y'+c2)$$

$$B=TF(Y'+c3)$$

The last step of the processing is going from RGB to XYZ. This is done using $$X=0.636958 \times R+0.144617 \times G+0.168881 \times B$$

$$Y=0.262700 \times R+0.677998 \times G+0.059302 \times B$$

$$Z=0.000000 \times R+0.028073 \times G+1.060985 \times B \quad \text{(equation A2)}$$

of this we are only interested in the Y component, so we use $$Y=0.262700 \times R+0.677998 \times G+0.059302 \times B.$$

Inserting the previous equations into this gives $$Y=0.262700 \times TF(Y'+c1)+0.677998 \times TF(Y'+c2)+0.059302 \times TF(Y'+c3),$$

or shortened to $$Y=f(Y')$$

We want the output value Y of this equation to match the original $Y_0$. Since the Y depends on Y' in three different places in a nonlinear way, there seems to be no easy way to invert the function so that we can get $Y'=f^{-1}(Y)$.

However, it is possible to linearize the nonlinear TF(x)~kx+m. Doing this in the three different places gives $$Y \sim k1 \times Y'+m1+k2 \times Y'+m2+k3 \times Y'+m3$$

which is equivalent to $$Y \sim (k1+k2+k3) \times Y'+(m1+m2+m3).$$

This can be inverted to $$Y' \sim Y'k=(Y_0-(m1+m2+m3))/(k1+k2+k3).$$

Thus it is likely that Y'k will produce a value Yk closer to $Y_0$ than before. The function can be linearized again at this new point Y'k, resulting in a new value Y'k+1, etc.

It should be noted that for all these iterative techniques it is not necessary to find the absolutely best 10 bit value that generates the Y value closest to the $Y_0$ value. It may be sufficient to just use a few iterations or even one iteration. The corrected Y value resulting from a single iteration will most likely be much better than not correcting at all.

Some linearizations may also be done in advance. As noticed above, the worst problems occur on the gamut edge. Hence one could have one linearization for the line connecting the red primary to the green primary, one linearization for the line connecting the red primary to the blue primary and one linearization for the line connecting the green primary to the blue primary. Another way may be to have linearizations that will be used close to the red primary, another close to the green primary, and a third that is used close to the blue primary. Furthermore it is possible to have several linearizations along the line of the gamut, as shown in FIG. 21.

Thus, there can be different linearizations in different areas. If the color is inside the circle with a solid line, we are close to the green primary and we can use one linearization. If we are further along towards the red primary, i.e. inside the dashed box, we can use a second linearization. If we are close to the edge of the gamut and roughly half way between the red and the green primary, i.e. inside the dotted box, a third linearization can be used. If we are even closer to the red primary, i.e. inside the box with a solid line, a fourth linearization can be used. If we are inside the dotted circle, i.e. close to the red primary, a fifth linearization can be used. The same partitioning of the other two lines in the triangle can also be used. Finally the area inside the triangle but in no box or circle can be partitioned into one or more areas, each area having a different linearization.

Another way is to create a look-up table (LUT). As can be seen from the above formulation, if we have Cb', Cr' and the wanted Y-value, it is possible to find the best Y' using any of the iterative techniques mentioned above. Hence we can create a look-up table for every possible combination of Cb', Cr' and Y. Assume for instance that Cb' and Cr' is quantized to 10 bits. Assume further that we also quantize Y to 10 bits. We then need $2^{10} \times 2^{10} \times 2^{10}$ different values in our look-up table. That is equivalent to $2^{30}$ values. If each value is two bytes, this means $2^{31}$ bytes, or 2 Gb. That is big but may be not infeasible, especially in the future.

Care may need to be taken when quantizing Y. Since Y is completely linear, it may be inefficient to just quantize it. It may instead be better to create Ynonlinear=TF(Y) and instead create a LUT for Y using Cb', Cr' and Ynonlinear as input variables. Given Cb', Cr' and Y, we would then first calculate Ynonlinear=TF(Y) and then find Y'=LUT(Cb', Cr', Ynonlinear).

It may also be possible to use a smaller LUT. For instance, it may be possible to quantize Y (or Ynonlinear), Cb' and Cr' to, say, 6 bits. Then the table size would be $2^{(6+6+6)}=2^{18}$ values or $2^{19}$ bytes, which is equal to 512 kbytes. That is a reasonable size even with today's hardware.

It may be possible to take the quantized values Cb', Cr' and Y closest to the true values and interpolate them. As an example, if the real value of Cb' is bigger than Cb' quantized to 6 bits but smaller than Cb' quantized to 6 bits+1, the following may be good approximation:

$Y'=(LUT(Cb'6bit,Cr'6bit,Y6bit)+(LUT(Cb'6bit+1, Cr'6bit,Y6bit))/2$

Interpolating between more than two values is also possible.

In an embodiment, a look-up table is used for deriving the value of Y'. In one version the look-up table contains every possible value of $Y_0$, Cb' and Cr'. For 10 bit video that will result in 1024×1024×1024 entries and in some applications this size is acceptable. In another version the look-up table (LUT) is pruned, for example through rounding one or more of $Y_0$, Cb' and Cr', e.g. to 8 bits. If a pruned look-up table is used the algorithm can be extended with a refinement step that finds the best Y' starting from the Y' that was retrieved from the LUT. In a version the LUT is only used when the Cb' value and/or the Cr' value is such that Y' can become too different from $Y_0$, i.e. when the initially calculated Y' gives a linear Y value that is too different from $Y_0$, and thereby the size of the LUT can be substantially reduced since many values of Cb' and Cr' will not cause any problems.

In an embodiment, a function of $Y_0$, Cb' and Cr', e.g. a linear combination, polynomial function, exponential function, logarithmic function, trigonometric function, etc., is used for deriving Y'. The function can be defined such that for any value of $Y_0$, Cb' and Cr' the difference between Y and $Y_0$ is below a certain threshold or the difference between the derived Y' and the optimal Y' is below a certain threshold.

In an embodiment several different functions of $Y_0$, Cb' and Cr' are defined for deriving Y'. The selection of which function to use is based on the value of $Y_0$, Cb' and Cr'.

For each embodiment described herein it could be the case that the method for deriving Y' is only invoked if the difference between Y' and $Y_0$ is above a certain threshold to begin with.

ANNEX B

This Annex B investigates color artifacts due to 4:2:0 subsampling. First, an attempt to cross-check is made, but the worst value cannot be reproduced, likely due to a bug in HDRTools that has already been fixed. Next, a search is performed for the worst relative error in luminance arising from 4:2:0 subsampling. It is found that a relative error of 86% (195 Barten steps) can occur even if displayed on a screen limited to 4000 nits. Even if data is restricted to Rec709 and held in a BT.2020 container, an error of 30 Barten steps is possible. For P3 content in a BT.2020 container, an error of 40 Barten steps is possible.

1 Introduction

It has been noted that small changes in color can introduce surprisingly large artifacts when 4:2:0 subsampling is used, even if no compression is happening.

1.1 Cross-Check Discrepancies

This investigation started as a cross-check of M35255 [3], trying to replicate the results on slide 13, reprinted in Table B1 below. The results are from a test image where the left part of the image up to pixel 95 has the color (3000, 0, 100) and the right part, pixel 96 and forward, has the color (3000, 4, 100).

TABLE B1

| | values of M35255 | | | | | |
|---|---|---|---|---|---|---|
| 4:2:0 10 bits | 94 | 95 | 96 | 97 | 98 | 99 |
| EXR | 3000 | 3000 | 3000 | 3000 | 3000 | 3000 |
| RGB | 0 | 0 | 4 | 4 | 4 | 4 |
| in | 100 | 100 | 100 | 100 | 100 | 100 |
| YCbCr | 258 | 258 | 404 | 404 | 404 | 404 |
| | 650 | 650 | 640 | 640 | 570 | 570 |
| | 882 | 882 | 870 | 870 | 787 | 787 |
| implied | 258 | 258 | 401 | 404 | 404 | 404 |
| YCbCr | 650 | 649 | 642 | 604 | 570 | 566 |
| | 882 | 881 | 862 | 828 | 787 | 782 |
| EXR | 3006 | 2958 | 10000 | 5860 | 2998 | 2764 |
| RGB | 0 | 0 | 1.57324 | 2.58008 | 3.99609 | 4.20313 |
| out | 99.1875 | 97.125 | 402.25 | 199 | 100.125 | 92.1875 |

When cross-checking using the same procedures as for the anchors (N14548, [2]) we got the result shown in Table B2. For downsampling, the filters described in Section 2.4.7 of [2] was followed (2 and 3 taps) and for upsampling Section 2.4.8 of [2] was followed (4 tap filters).

TABLE B2 values when trying to crosscheck

| 4:4:4 10 bits | 94 | 95 | 96 | 97 | 98 | 99 |
|---|---|---|---|---|---|---|
| EXR | 3000 | 3000 | 3000 | 3000 | 3000 | 3000 |
| RGB | 0 | 0 | 4 | 4 | 4 | 4 |
| in | 100 | 100 | 100 | 100 | 100 | 100 |
| YCbCr | 258 | 258 | 404 | 404 | 404 | 404 |
| 4:2:0 | 650 | | 580 | | 570 | |
| | 882 | | 799 | | 787 | |
| YCbCr | 258 | 258 | 404 | 404 | 404 | 404 |
| after | 650 | 616 | 580 | 571 | 570 | 569 |
| upsampling | 882 | 841 | 799 | 788 | 787 | 786 |
| EXR | 3006 | 1551 | 3644 | 3048 | 2998 | 2950 |
| RGB | 0 | 0.0169 | 3.5293 | 3.9531 | 3.9961 | 4.0391 |
| out | 99.1875 | 48.2188 | 122.9375 | 102.2500 | 100.125 | 98.0625 |

As can be seen, this matches really poorly and only pixel nos. 94 and 98 matches, whereas no match is found for pixel nos. 95-97 or 99. However, moving the discontinuity to pixel 97 instead gives a much better match, as shown in Table B3.

TABLE B3 values when moving the discontinuity

| 4:4:4 10 bits | 94 | 95 | 96 | 97 | 98 | 99 |
|---|---|---|---|---|---|---|
| EXR | 3000 | 3000 | 3000 | 3000 | 3000 | 3000 |
| RGB | 0 | 0 | 0 | 4 | 4 | 4 |
| in | 100 | 100 | 100 | 100 | 100 | 100 |
| YCbCr | 258 | 258 | 258 | 404 | 404 | 404 |
| 4:2:0 | 650 | | 640 | | 570 | |
| | 882 | | 870 | | 787 | |
| YCbCr | 258 | 258 | 258 | 404 | 404 | 404 |
| after | 650 | 649 | 640 | 604 | 570 | 566 |
| upsampling | 882 | 881 | 870 | 828 | 787 | 782 |
| EXR | 3006 | 2958 | 2476 | 5860 | 2998 | 2764 |
| RGB | 0 | 0 | 0.00142 | 2.58008 | 3.99609 | 4.20312 |
| out | 99.1875 | 97.125 | 80.5625 | 199 | 100.125 | 92.1875 |

In Table B3, only pixel no. 96 does not match. That is also the pixel with the strangest values (10000, 1.57, 402.25), the correct answer being (3000, 0, 100) or (3000, 4, 100) depending on where you put the discontinuity.

It seems as if the mismatch in the crosscheck is due to an error that has already been corrected in HDRtools. If reverting to revision 492, we can produce the same values as in M35255 [3]. To confirm that the newer version of HDRtools (revision 573) is correct we have independently implemented the processing chain in Matlab and we get the same results as in Table B3. The reason why we had to move the discontinuity to get a match is probably due to the faulty filtering in revision 492 which has been fixed in the current version.

1.2 Rounding Issue

When implementing the Matlab crosscheck, we realized that the conversion of float to EXR in HDRtools lacks rounding. Instead of rounding the 23 bits of the mantissa to 10 bits, they are just right-shifted, basically replacing a round( ) with a floor( ). This affects the end result. As an example a float of 3007.9 will be converted to 3006.0, even though 3008.0 is a much closer value. To get a match we made the Matlab code emulate the floor( ) type conversion in the current revision of HDRtools (revision 587 of [4]).

1.3 Color Outliers

Note that even if pixel 96 is no longer an extreme outlier, pixel 97 is still quite far from correct: (5860, 2.58, 199) instead of (3000, 4, 100). That raises the question; how bad outliers can 4:2:0 subsampling generate and where does this happen? To answer this question we first have to define what we mean by "bad". We concentrated on the luminance, since the human visual system is more sensitive to changes in luminance than in chrominance. Hence we transformed both the input ExR image and the output ExR image both linear light to XYZ, and formed the difference in Y. To get a relative error we then divided by the Y component of the original. We then wrote a small program maximizing this relative error for pixel 97 over all possible images of the type where the left part is of one color and the right part is the same color plus a small delta of length 4, just as was done in M35255 [3].

Running this program gave the answer that having the color (2142, 0, 138) in the left part and (2142, 4, 138) in the right part gives the largest visible error, as shown in Table B4. The optimization software that looks for the "worst" error is not guaranteed to find the global maximum, hence even worse positions in the color gamut may exist.

TABLE B4 data for the "worst" color for 4:2:0 subsampling

| pixel 97 | RGB value | Y value | Y diff | relative error | Barten steps |
|---|---|---|---|---|---|
| original | 2142 4 138 | 573.5991 | 0 | 0 | 0 |
| RGB 4:4:4 | 2142.6617 3.9750 138.2966 | 573.7735 | 0.1745 | 0.0304% | 0.0691 |
| RGB 4:2:0 | 3993.7333 2.4265 263.6030 | 1066.4311 | 492.8320 | 85.9192% | 195.2710 |

It should be noted that having a red component higher than 2142 would generate an even higher relative error. However, we assumed that RGB values above 4000 would be clipped to 4000 by the monitor, so we believe that the actual on-screen difference would start to diminish if higher values were used.

As can be seen in Table B4, the relative error for RGB 4:4:4 is 0.0304%. To put that in perspective, we compared that with Barten's curve, see FIG. 22 illustrating Barten's curve for contrast sensitivity. A contrast below the curve is not noticeable. Table B5 shows the values used for plotting the curve in FIG. 22.

TABLE B5 values used for plotting the Barten's curve

| Luminance in cd/m$^2$ | Contrast (%) |
|---|---|
| $10^{-3}$ | 13.8294 |
| $10^{-2}$ | 4.5454 |
| $10^{-1}$ | 1.7461 |
| $10^{0}$ | 0.8507 |
| $10^{1}$ | 0.5454 |
| $10^{2}$ | 0.4360 |
| $10^{3}$ | 0.4027 |
| $10^{4}$ | 0.3962 |

As can be seen in FIG. 22, the tolerance for relative errors decreases with increased luminance. At 100 nits, an error of 0.44% can be just noticeable, whereas at 1000 nits, an error of 0.40% can be just noticeable. Since 455 nits is right between these, we use the higher value of 0.44%. This gives a Barten step of 0.069, which means it is not noticeable.

For 4:2:0 subsampling, on the other hand, the relative error is 85.92%. This is equivalent to over 195 Barten steps, which should be clearly visible. It therefore seems reasonable to conclude that 4:2:0 subsampling can create clearly visible artifacts, at least together with non-constant luminance and a highly non-linear transfer function as is the case in the anchor generation.

Note that the worst error is right on the border of the color gamut; since the green color is zero, the color (2142, 0, 138) is on the line between the red and green color primaries. This is consistent with what was reported in M35255 [3], which also pointed out colors on the gamut edge as problematic.

1.4 when Input is 709 Data

Figure 23:
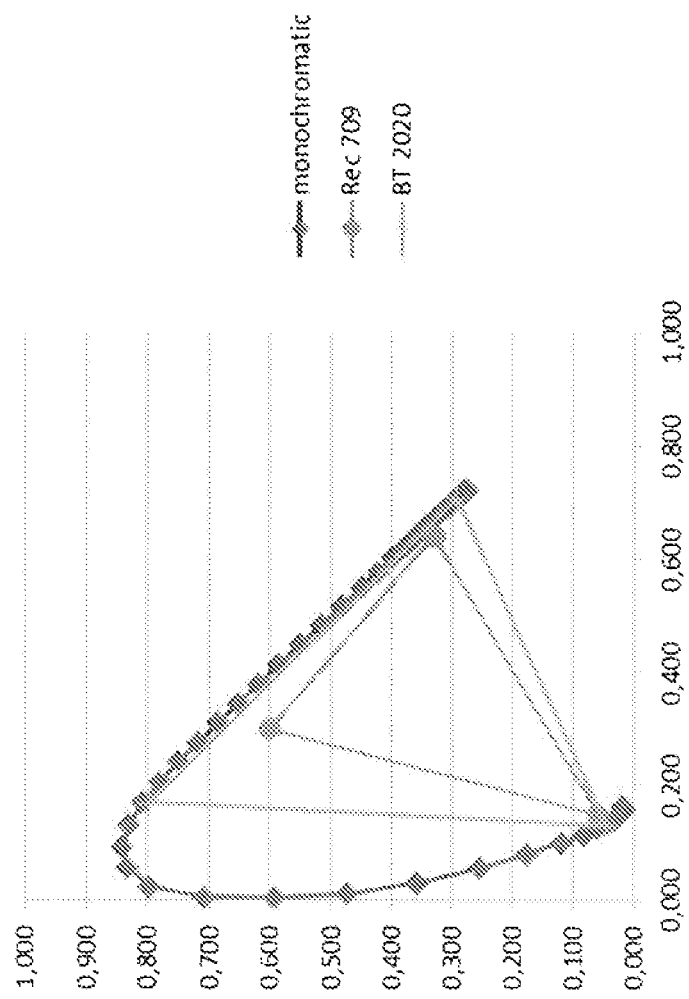
FIG. 23 illustrates a comparison between Rec709 and BT.2020 color gamuts.

The data presented in Table B1 was for BT.2020 primaries. If the input data is with Rec709 primaries, but the container is BT.2020, it will not be possible to reach the color gamut boundary. This is due to the fact that the Rec709 gamut triangle is inside the BT.2020 triangle, not touching the gamut boundary, as can be seen in FIG. 23. It is therefore reasonable to assume that the relative error will be smaller.

We have run the optimization software to find the Rec709 color that, after conversion to BT.2020, would result in the largest relative error. The resulting two colors are (0, 0, 50) for the left part of the screen and (2, 3, 49) in the right part. This is presented in Table B6.

TABLE B6 data for the "worst" color for 4:2:0 subsampling
if input is Rec709 and container format is BT.2020

| pixel 97 | RGB value | Y value | Y diff | relative error | Barten steps |
|---|---|---|---|---|---|
| original Rec709 color | 2 3 49 | | | | |
| original BT.2020 color | 4.3650 3.4535 44.1810 | 6.1082 | | | |
| RGB 4:4:4 | 4.3793 3.4293 43.7035 | 6.0672 | 0.0410 | 0.6711% | 1.2305 |
| RGB 4:2:0 | 4.4055 2.9939 63.5135 | 7.2163 | 1.1082 | 18.1422% | 33.2640 |

Here we have used the Barten curve at 10 nits, which equals 0.54%. For RGB 4:4:4 we then get an error that is just noticeable at 1.2305 Barten steps, whereas the error in RGB 4:2:0 equals 33 Barten steps, which should be clearly visible. It is also reasonable that the error is smaller (33 Barten steps vs. 195 Barten steps) since starting out with Rec709 data precludes the color from reaching all parts of the gamut edge of BT.2020.

Notice also how the optimization result has found that the worst error is available near the blue primary. This is likely because the blue Rec709 primary is closest to the BT.2020 gamut edge, as can be seen in FIG. 23.

1.5 when Input is P3 Data

The same test can be carried out for P3 source data contained in a BT.2020 container. The worst colors are then (2.48, 3.32, 4.63) and (3.29, 0, 6.71), as shown in Table B7.

TABLE B7 data for the "worst" color for 4:2:0 subsampling
if input is P3 and container format is BT.2020

| pixel 97 | RGB value | Y value | Y diff | relative error | Barten steps |
|---|---|---|---|---|---|
| original P3 color | 3.29 0 6.71 | | | | |
| original BT.2020 color | 2.7993 0.2342 6.5960 | 1.2853 | | | |
| RGB 4:4:4 | 2.8099 0.2304 6.4838 | 1.2788 | 0.0065 | 0.5062% | 0.5951 |
| RGB 4:2:0 | 1.4911 0.3834 3.2402 | 0.8438 | 0.4416 | 34.3530% | 40.38 |

We would assume that the error would be somewhere between that of Rec709 and BT.2020, and this is also the case, we now get an error equivalent of 40.38 Barten steps. Note that since the Barten value changes, it is important to include it in the loop when searching for the worst value. We have used the Barten value for 1 cd/m$^2$, which equals 0.85%.

1.6 Conclusion

This Annex has investigated the error in luminance due to 4:2:0 subsampling. Although we have not been able to match the worst outlier from M35255 [3], the worst case errors are still significant, reaching almost 200 Barten steps for general data. Even if the source data is constrained to Rec709 and put into a BT.2020 container, the error is still significant, over 30 Barten steps, and for P3 data in a BT.2020 container, over 40 Barten steps.

ANNEX C

The present Annex C comprises a description of the Ajustc method that can be used according to the embodiments in order to derive non-linear chroma component value(s) in the second color space.

A combination of a highly non-linear transfer function, 4:2:0 subsampling and non-constant luminance ordering gives rise to severe artifacts in saturated colors. An example is described in [3], where changes between two colors of similar luminance can result in a reconstructed image with very different luminances. In this Annex we call this way of processing the video the "anchor" way, since it was used to create the anchors in the MPEG call for evidence, described in [2].

One way to get around the problem was described is described in Annex A, a method that we will refer to as Ajusty. In the Ajusty method, the Y'-value in every pixel is adjusted so that the resulting linear luminance Y is closer to its correct value. It is therefore possible to compensate for the fact that some of the luminance is also carried in the chroma components Cb' and Cr'.

In this Annex we will use the following terminology:

RGB: Linear RGB values, where each value is proportional to the cd/m² ("number of photons").

XYZ: Linear XYZ values, where each value is a linear combination of RGB. Y is called "luminance" and loosely speaking reflects well what the eye perceives as "brightness.

pq(Y): A non-linear representation where the non-linear function pq(Y) has been applied to the linear luminance Y. pq(Y) is not to be confused with Y'. Since pq(.) resembles Barten's curve, pq(Y) a small step in pq(Y) is equivalent to a small step in perceived luminance.

R'G'B': Non-linear RGB values. R'=pq(R), G'=pq(G), B'=pq(B), pq(.) being a non-linear function. An example of a non-linear function is the PQ transfer function.

Y'Cb'Cr': A non-linear representation where each value is a linear combination of R', G' and B'. Y' is called "luma", and Cb' and Cr' are collectively called "chroma". This is to distinguish Y' from luminance, since Y' also contains some chrominance, and Cb' and Cr' also contains some luminance.

xy: A non-linear representation of chrominance, since it has been normalized for "brightness" through x=X/(X+Y+Z), y=Y/(X+Y+Z). A monochromatic laser will always have the same coordinates in xy no matter what intensity it has. This means that xy is a good measure of chrominance.

u'v': A non-linear representation of chrominance, that is a non-linear function of xy. It is supposed to be more perceptually uniform, meaning that a small step in u'v' will be equally perceptible regardless of which chrominance we are at.

pq(Y)xy: A representation of color where pq(Y) contains all the luminance and xy all the chrominance. From pq(Y) it is possible to extract Y, and from Y, x, and y it is possible to extract XYZ which can be transformed to RGB.

The problem with using the anchor processing chain is that apart from getting inaccurate luminance, we may also get inaccurate chrominance. This is due to the fact that the chroma samples Cb' and Cr' are subsampled in the Y'Cb'Cr' space. There is a problem with this, namely that the non-linearity of the Y'Cb'Cr' space will favor dark colors. This is not a desired outcome. This means that the chroma samples Cb' and Cr' will be inaccurate to start with.

Since the first part of subsampling is filtering, and since filtering is a kind of averaging, it is sufficient to see what happens when we average two colors. It is easier to see what happens when we average in the R'G'B' domain than in the Y'Cb'Cr', so first we will prove that averaging in these two domains amounts to the same thing. To do this, first note that Y'Cb'Cr' is just a linear combination of R'G'B':

$Y'=0.212600 \times R'+0.715200 \times G'+0.072200 \times B'$ $Cb'=-0.114572 \times R'-0.385428 \times G'+0.500000 \times B'$ $Cr'=0.500000 \times R'-0.454153 \times G'-0.045847 \times B'$ (equation C1)

Thus if the vector q holds the color in R'G'B'; q=(q1, q2, q3)=(R', G', B') and the vector p holds the same color in (Y', Cb', Cr'), p=(p1, p2, p3)=(Y', Cb', Cr'), we have $p=Mq,$ where M is the matrix above. Likewise $q=M^{-1} p$. Assume we have two vectors in Y'Cb'Cr', $p_1$ and $p_2$ that we want to average. We will now show that first going to R'G'B', then performing the averaging, and then going back is the same as just averaging $p_1$ and $p_2$ directly. We go to R'G'B' by using $q_1=M^{-1} p_1$, and $q_2=M^{-1} p_2$.

The average in the R'G'B' space is $q_a=\frac{1}{2}(q_1+q_2)$, but this is equal to $q_a=\frac{1}{2}(q_1+q_2)=\frac{1}{2}(M^{-1}p_1+M^{-1}p_2)=M^{-1}\frac{1}{2}(p_1+p_2)$.

Going back to Y'Cb'Cr' is done by multiplying with M, $p_a=M\ q_a=M\ M^{-1}\frac{1}{2}(p_1+p_2)=\frac{1}{2}(p_1+p_2)$, but this is the same thing as you would get if you averaged in Y'Cb'Cr' directly. We now only have to show that subsampling in R'G'B' favors dark colors.

Consider the two RGB colors (1000, 200, 0) and (10, 200, 0). The first color is very red, and the second color is very green. However, the first color is so much brighter than the second. If seen at a distance so that they blur into one, the net effect would be a reddish pixel since ½[(1000, 200, 0)+(10, 200, 0)]=(505, 200, 0), which is more red than it is green. However, in R'G'B', the two colors get the values (0.7518, 0.5791, 0) and (0.2997, 0.5791, 0). Their average will be ½[(0.7518, 0.5791, 0)+(0.2997, 0.5791, 0)]= (0.5258, 0.5791, 0), which when converted back to RGB is (119, 200, 0). Thus, the resulting color when averaged in the R'G'B' domain is almost twice as green as red. Thus, the dark color (10, 200, 0), which is green, has had an unduly big influence on the average.

To see how this can look in practice, consider a small image that is just 2×2 pixels, containing the following linear RGB colors:

| (3.41, 0.49, 0.12) | (0.05, 0.08, 0.02) |
|---|---|
| (0.05, 0.08, 0.02) | (0.05, 0.08, 0.02) |

Since this is an HDR image, it is hard to show it in a low-dynamic range medium such as this document. However it is possible to do several LDR-exposures by applying the function $LDR\_red=clamp(0,255*(HDR\_red*2^c)^{gam},255),$ where c goes from −3 to 1, gam=0.45 and clamp(a, t, b) makes sure the value t is between [a,b]. This can be called LDR-"exposures" of the HDR image.

The HDR pixel is quite dark—the highest coefficient is 3.41 out of 4000, so the darkest exposure is the most relevant here. The top left pixel is reddish and the surrounding pixels look black. Only in the brighter exposures is it possible to see that the dark pixels are actually a bit greenish.

However, when following the anchor processing chain to convert from RGB to Y'Cb'Cr'420 and back again, the resulting HDR image will be

| | |
|---|---|
| (1.14, 0.79, 0.38) | (0.12, 0.06, 0.01) |
| (0.12, 0.06, 0.01) | (0.12, 0.06, 0.01) |

The problem here is that the redness of the top left pixel has disappeared and has been replaced with a gray/white pixel. The reason is that averaging in the non-linear Y'Cb'Cr' domain favors dark colors, which will make the resulting pixel unduly green. Furthermore, since there are three green pixels and just one red pixel, the result will be yet greener. The result is not very similar to the original.

In contrast, the result of the solution proposed in this Annex can be seen below. The colors are closer to the original, especially in the relevant first exposure and in the important top left pixel, which is now more reddish. Note that in general it is not possible to get a perfect color in all four pixels since the chrominance is subsampled, hence even the proposed Ajustc method will not generate a perfect color. Nevertheless, the color fidelity is greatly improved.

| | |
|---|---|
| (2.26, 0.90, 0.49) | (0.20, 0.02, 0.00) |
| (0.20, 0.02, 0.00) | (0.20, 0.02, 0.00) |

After having corrected the luma value Y', it is more or less possible to obtain the desired luminance Y. However, since some of the chrominance information is carried in the luma, changing Y' will also affect the chrominance of the pixel. This means that while the luminance value of the pixel improves with the correction of Y', its chrominance might deteriorate compared to the anchor processing chain, which was quite poor to start with. The end result may be a very poor chrominance.

The embodiments relate to video coding and processing of at least one pixel of a picture of a video sequence. The processing is a pre-process to encoding or part of the encoding step.

The embodiments propose a novel way of arriving at the subsampled chroma samples Cb' and Cr' when processing a pixel of the video sequence.

The anchor chain according to prior art uses the following process:

RGB 4:4:4→R'G'B' 4:4:4→Y'Cb'Cr' 4:4:4-subsampling-of-Cb'-and-Cr'→Y'Cb'Cr'4:2:0, where the subsampling from 4:4:4, i.e. full resolution for all color components, to 4:2:0, i.e. chroma components subsampled in both vertical and horizontal directions, is done in the last step of the chain.

According to embodiments the following process is proposed:

RGB 4:4:4-subsampling-of-RGB→RGB 2:2:2→R'G'B' 2:2:2→Y'Cb'Cr' 2:2:2 where the subsampling instead is the first part of the chain and is performed in the linear domain. Here we have used the term 2:2:2 to indicate that all three samples are at half resolution in both the x- and y-dimension. In this way, we do not get a full-resolution Y' component, since the Y' component in the last step is 2:2:2, i.e., half resolution in both directions. This problem is overcome by the following processing steps:

RGB 4:4:4→XYZ 4:4:4→Y 4:4:4--------+----→Y'=Ajusty(Y4:4:4, Cb'Cr'4:4:4)
Y'Cb'Cr'2:2:2→Cb'Cr'2:2:2--upsample→Cb'Cr'4:4:4------/ where Y 4:4:4 is the luminance component of XYZ 4:4:4 and Cb'Cr' 4:4:4 are the chroma components of Y'Cb'Cr'. In short, the target luminance Y 4:4:4 is found by first converting RGB 4:4:4 to XYZ 4:4:4 and then using Y 4:4:4. We then get Cb'Cr' 4:4:4 by upsampling Y'Cb'Cr' 2:2:2 to 4:4:4 and using Cb'Cr' 4:4:4. Finally, the Ajusty method is used on Y 4:4:4 and Cb'Cr' 4:4:4 to find the best Y' 4:4:4.

In an alternate embodiment it is possible to do the following to obtain Y':

RGB 4:4:4→R'G'B'4:4:4→Y'Cb'Cr'4:4:4→Y'4:4:4.

However, this may produce the wrong Y-luminance in the general case.

Figure 24:
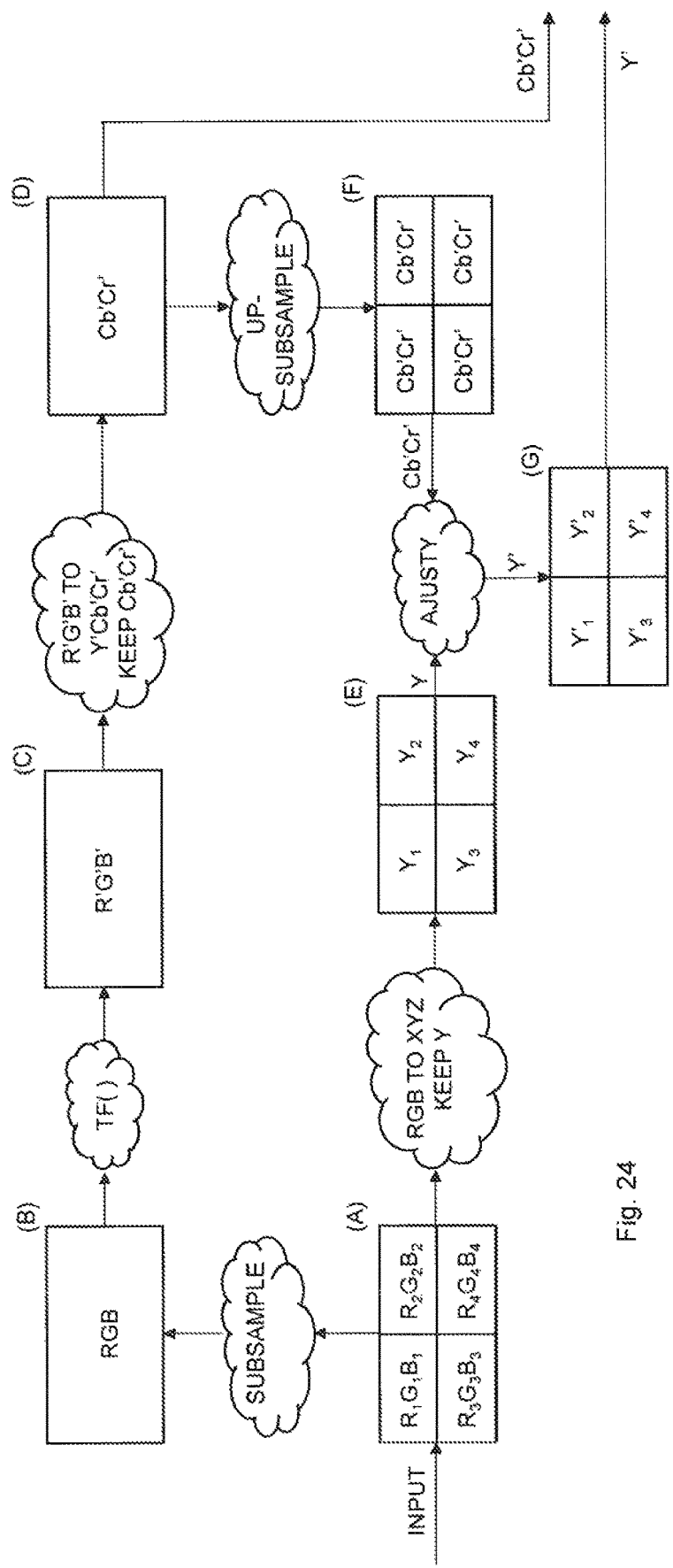
FIG. 24 illustrates an embodiment of obtaining Cb and Cr by subsampling in linear RGB and obtaining Y' by using Ajusty.

Once having arrived at a Y'Cb'Cr'420-representation, as shown in FIG. 24, the Y' component is found in (G) and the Cb'Cr' components are found in (D), it is possible to further improve it. The reason is that the each Cb' value, not being full resolution, will be used for several Y' values. However, due to the non-linear nature of the Y'Cb'Cr' space, changing the Y' component will affect not only the luminance of the pixel, but also the chrominance. Only one Y'-value will give the correct chrominance, namely the Y' from Y'Cb'Cr' 2:2:2 that we threw away, and if we deviate from this the chrominance will shift slightly. Some pixels will be larger than the Y' 2:2:2 value, and in those pixels the chrominance will be shifted in one way. Some other pixels will be smaller than the Y' 2:2:2 value, and their chrominances will be shifted the opposite way. Due to the nonlinearities involved, these shifts may not cancel out. Therefore it may be advantageous to correct Cb' in a way opposite to the way the aggregate chrominance has shifted. Thus the second part is to perform such a correction.

By subsampling in a linear space before converting to Y'Cb'Cr, we can get chroma samples that better reflect the true chrominance in a scene, compared to the anchor process. However, subsampling early in the chain means that we need to come up with a Y'-component some other way. This is solved by using the Ajusty method to use Y' to match a given luminance Y given Cb' and Cr'.

In another aspect, the Cb' and Cr' samples are further refined to counteract the shifting that happens when the low-resolution Y' component is replaced by a high resolution Y' component. This further improves the color fidelity.

In yet another aspect, the Y' samples after the Ajusty method are modified towards the Y' values before the ajusty method if that reduces the error in another metric than the luminance without causing any visual degradation of the luminance.

Figure 25:
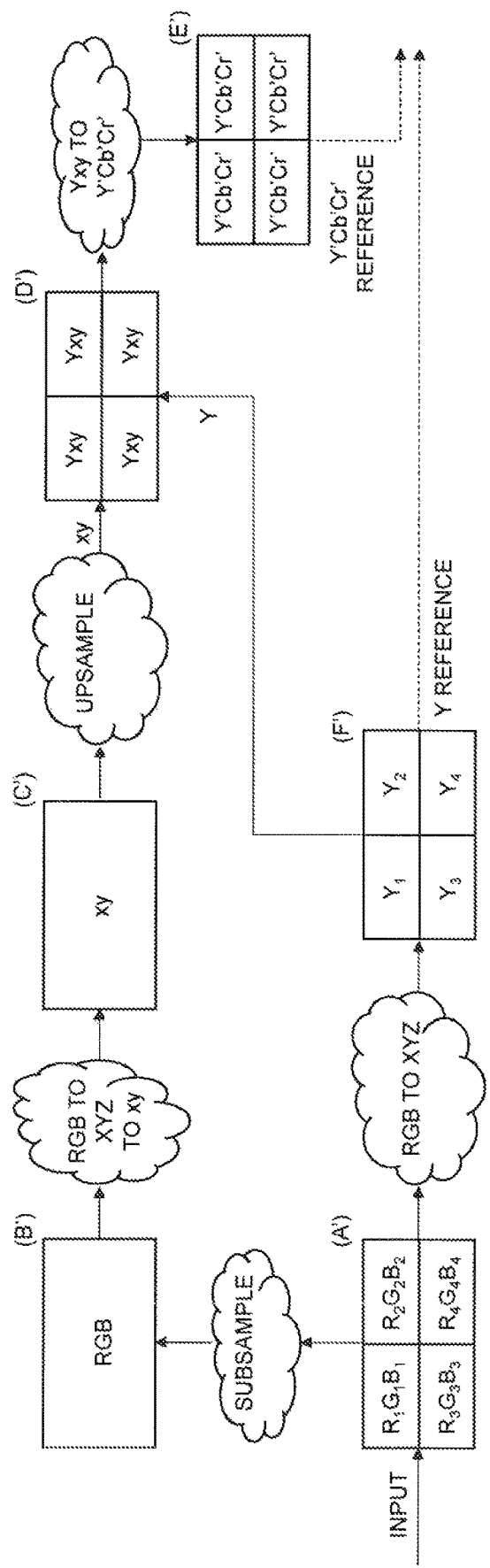
FIG. 25 illustrates an embodiment of creating references with chroma upsampling in a representation invariant to intensity.
Figure 26:
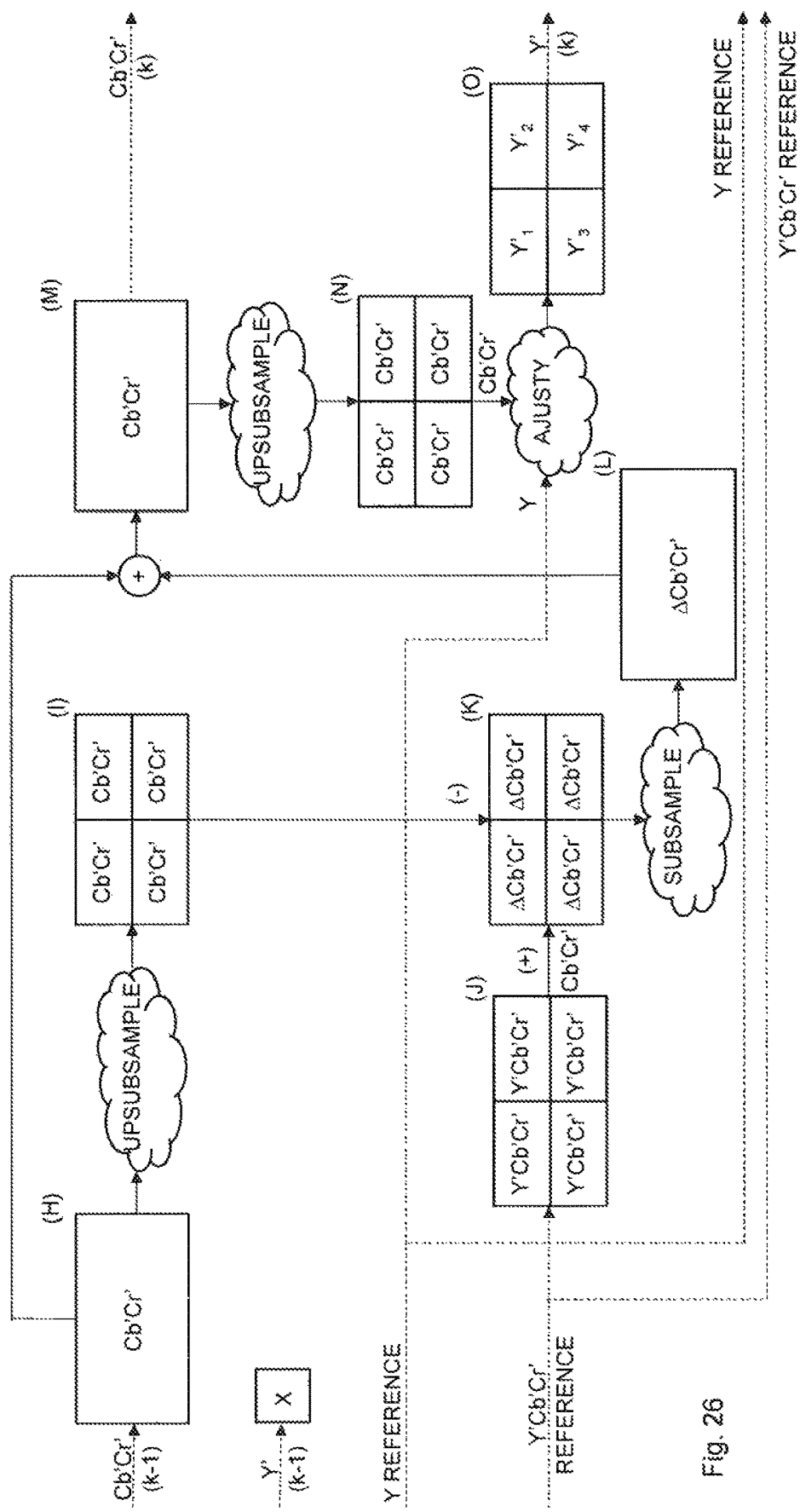
FIG. 26 illustrates an embodiment of iterative refinement of Cb and Cr.

The proposed method is described in FIGS. 24-26. The input is a high resolution image in linear RGB. In these diagrams we have an image of 2×2 pixels for illustration purposes, but a real image is of course much bigger.

The embodiments described below can be used in combination or separately.

First Embodiment—Find Good Values for Y' and Cb'Cr'

1. The first step is to subsample the RGB image (A) to obtain (B), subsampling in both the x- and y-dimension.
2. Next we create the first version of the Cb'Cr' coefficients by first applying the non-linear transfer function TF(.) to obtain R'G'B' (C) and then converting this to Y'Cb'Cr', keeping Cb'Cr' (D). Now we have Cb'Cr' in the correct, low, resolution.
3. To also get Y' in the correct, high, resolution, we need the reference linear luminance Y for each pixel. We get that by converting the full resolution RGB input (A) to XYZ and keeping Y (E).
4. We also upsample Cb'Cr' (F). We can now use AJUSTY on Y (E) and Cb'Cr' (F) to get Y' (G).
5. The output is now Cb'Cr (D) and Y' (G).

Second Embodiment—Improve Values for Y' and Cb'Cr'

In this embodiment the Cb'Cr' from the first embodiment are updated by the difference between the Cb'Cr' derived from upsampling in a representation invariant to intensity and the upsampled Cb'Cr' from the first embodiment. The updated Cb'Cr' is then used together with the linear luminance Y to derive new Y' values using ADJUSTY. All steps are shown below and are also indicated in FIGS. 24-26.
First Step:
1. To improve the values we first need to create some references. We start with the linear RGB input (A'), which is the same as (A). The first reference is simply the full resolution linear luminance Y, which is obtained by converting RGB (A') to XYZ and throwing away XZ and keeping Y (F'). This is the same as (E).
2. We then subsample the RGB (A') to (B'), which is the same as (B).
3. The next step is to convert from RGB (B') to XYZ and then to xyz, throwing away z and keeping xy (C').
4. The xy-values are then upsampled, and combined with Y (F') to form Yxy (D').
5. Each Yxy value (D') is then converted back to XYZ, then to RGB, then to R'G'B' and lastly to Y'Cb'Cr' (E'). This is the second reference.
Second Step: Iterating.
1. We take the Cb'Cr' data (H). If we are in the first iteration, this is the same as (D). If we are in iteration k, this is the same as (M) for iteration k−1. We upsample (H) to get (I).
2. We get the Y'Cb'Cr' reference (J), which is the same as (E'), and throw away the Y' keeping the Cb' and Cr' for each pixel. Then the Cb' and Cr' from (I) is subtracted, obtaining (K), which is a difference □Cb'□Cr' in each pixel.
3. The difference signal in (K) is then subsampled (L), and then added to the Cb'Cr' signal in (H), resulting in an updated version of Cb'Cr' (M).
4. We now only need the Y' in the correct resolution. We do this by upsampling Cb'Cr' (M) to the higher resolution (N). The upsampled Cb'Cr' (N) together with the Y reference (F') is used by AJUSTY to produce Y' (O). The output is now Cb'Cr' (M) and Y' (O).

It should be noted that when we say "convert RGB to XYZ and keep Y", it is often not necessary to convert all three components and then keeping only one. Typically in these cases it is possible to calculate only one the component that we want to keep. We have used this way of writing to emphasize that we mean Y from XYZ and not Y' from Y'Cb'Cr'.

In an alternative embodiment the "find good values for Y' and Cb' Cr'" is replaced by the anchor processing chain; RGB 4:4:4→R'G'B' 4:4:4→Y'Cb'Cr' 4:4:4→subsampling Y'Cb'Cr' 4:2:0. Then a new reference Y must be created each iteration by taking Y'Cb'Cr' 4:2:0-upsample-Cb'-and-Cr'→Y'Cb'Cr' 4:4:4→R'G'B' 4:4:4→RGB 4:4:4→XYZ 4:4: 4→Y 4:4:4. This Y is then used in (D') instead of (F'). This will not create as good a luminance, but can be good under certain circumstances when you want to keep the anchor processing chain intact in the start, for instance for complexity reasons.

It should be clear that any target image can be used. In the above we use a target image that has a chrominance that is first subsampled in RGB and then converted to xy, together with a luminance Y that comes from the non-subsampled RGB converted to XYZ. However, it would be equally simple to use another target image. As an example, one may want to first convert the image from RGB to XYZ and then to xy, and then subsample this to get the subsampled xy. This could be combined with the same luminance Y. This particular embodiment would be good if you wanted to preserve the chrominance regardless of brightness. Also other target images could be used.

Adaptive Subsampling

In another embodiment the subsampling in above embodiment consists of an adaptive filter which is optimized to reduce the error in a representation space in accordance with human vision.

Cb' Cr' Iterative Refinement

In another embodiment one of or both of Cb' and Cr' are modified to get a better representation in the original representation space (or a representation space in accordance with human vision). The modification can be performed by iterative testing to modify a Cb' or Cr' value +1 or −1 and then upsample the modified value and unmodified values of Cb' and Cr', conversion to R'G'B', application of non-linear transfer function and converting to a representation space in accordance with human vision. If the modified Cb'/Cr' gives less absolute or squared error for a spatial region in a chroma specific color component representation space (not luminance) similar to Z for Cb' and X for Cr', the modification is selected. The spatial region is related to the size of the upsampling filter(s). If bi-linear filters are used for the upsampling of 4:2:0 Cb' or Cr' refinements to 4:4:4 the size of the region is 3 horizontally and 4 vertically. If 4-taps filters are used for the upsampling the size of the region is 7 horizontally and 8 vertically. The error can also be weighted according to how a modified value can influence each of the 3×4 or 7×8 neighboring samples in 4:4:4 or just simply include the central part (3×2) of the region.

Cb' Cr' Initialization

In another embodiment the magnitude of a Cb' or Cr' refinement is initialized to the magnitude of the average value of ajusty in the central 3×2 region around the sample to be modified. The sign of the Cb' or Cr' refinement is derived by taking the sign from the average of the error before the refinement in a chroma specific color component representation space (not luminance) similar to Z for Cb' and X for Cr'. Thus initial value of the Cb' refinement is Cb'+sign(error)×abs(average(Y' before adjust−Y' after adjust)/N). Where N is about 2. If the modified Cb' gives less absolute or squared error for a spatial region in a chroma specific color component representation space (not luminance) similar to Z for Cb', the modification is selected. Similar applies if the method is applied for Cr. In another embodiment the magnitude of a Cb' or Cr' refinement is initialized to the average value of Cb' or Cr' in 4:4:4 in the central 3×2 region around the sample to be modified. Thus init value of the Cb' refinement is average(Cb' in 4:4:4). If the modified Cb' gives less absolute or squared error for a spatial region in a chroma specific color component representation space (not luminance) similar to Z for Cb', the modification is selected. Similar applies if the method is applied for Cr'.

Y' Refinement

In another embodiment the adjustment of Y' to Ymod' by the Ajusty method is modified by one step towards Y' if that reduces the error in a chroma specific color component representation space similar to Z in XYZ (a metric other than luminance) while not causing any visual degradation in luminance Y. This can besides improving performance in a chroma specific color representation space also in some cases make it easier to encode Y'.

Certain embodiments in this Annex describe the conversion from RGB 4:4:4 to Y'Cb'Cr' 4:2:0 where the chroma components are subsampled in both vertical and horizontal direction. The methods of the embodiments would of course work equally well when converting from RGB 4:4:4 to another subsampled Y'Cb'Cr format, e.g. Y'Cb'Cr' 4:2:2 where the chroma components have been subsampled in the horizontal direction only. Moreover, it would also be possible to subsample only one of the chroma components.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] Society of Motion Picture and Television Engineers, ST 2084:2014. High Dynamic Range Electro-Optical Transfer Function of Mastering Reference Displays
[2] International Organization for Standardization, ISO/IEC JTC1/SC29/WG11, Coding of moving pictures and audio, MPEG2014/N14548, July 2014, Sapporo, Japan, Luthra et al., Test sequences and anchor generation for HDR and Wide Gamut Content Distribution
[3] International Organization for Standardization, ISO/IEC JTC1/SC29/WG11, Coding of moving pictures and audio, MPEG2013/M35255, October 2014, Strasbourg, France, Francois et al., About using a BT.2020 container for BT.709 content
[4] https://wg11.sc29.org/svn/repos/ExplorationsWZ/HDR-Tools/branches/0.9-dev
[5] International Organization for Standardization, ISO/IEC JTC1/SC29/WG11, Coding of moving pictures and audio, MPEG2014/N15083, February 2015, Geneva, Switzerland, Luthra et al., Call for Evidence (CfE) for HDR and WCG Video Coding

The invention claimed is:

1. A method of pre-processing a pixel in a picture to improve a visual quality of the picture, said method comprising:
    determining, based on a minimum color component value for said pixel, whether to use a default processing chain to derive a luma component value, a first subsampled chroma component value, and a second subsampled chroma component value or whether to use an auxiliary processing chain to derive at least one of said luma component value, said first subsampled chroma component value, and said second subsampled chroma component value; and
    based on the determination, deriving one or more of said luma component value, said first subsampled chroma component value, and said second subsampled chroma component value.

2. The method according to claim 1, wherein determining whether said default processing chain or said auxiliary processing chain is used comprises selecting said auxiliary processing chain if said minimum color component value is below a threshold value and otherwise selecting said default processing chain.

3. The method according to claim 1, wherein determining whether said default processing chain or said auxiliary processing chain is used comprises determining, based on said minimum color component value and a maximum color component value for said pixel, whether said default processing chain is used to derive said luma component value, said first subsampled chroma component value and said second subsampled chroma component value or whether said auxiliary processing chain is used to derive said at least one of said luma component value, said first subsampled chroma component value and said second subsampled chroma component value.

4. The method according to claim 3, wherein determining whether said default processing chain or said auxiliary processing chain is used comprises determining, based on a quotient between said maximum color component value or a weighted version thereof and 1) said minimum color component value or a weighted version thereof, or 2) a sum of said minimum color component value or said weighted version thereof and a constant, whether said default processing chain is used to derive said luma component value, said first subsampled chroma component value and said second subsampled chroma component value or whether said auxiliary processing chain is used to derive said at least one of said luma component value, said first subsampled chroma component value and said second subsampled chroma component value.

5. The method according to claim 4, wherein determining whether said default processing chain or said auxiliary processing chain is used comprises selecting said auxiliary processing chain if said quotient exceeds a threshold value and otherwise selecting said default processing chain.

6. The method according to claim 5, further comprising: calculating a function value as $$\frac{max}{min+s},$$

wherein max represents said maximum color component value or said weighted version thereof, min represents said minimum color component value or said weighted version thereof and s is said constant; and
    comparing said function value with said threshold value.

7. The method according to claim 4, wherein determining whether said default processing chain or said auxiliary processing chain is used comprises:
    inputting color component values for said pixel in a look-up table configured to output a first value if said quotient exceeds a threshold value and otherwise output a second value;
    selecting said auxiliary processing chain if a value output from said look-up table is equal to said first value; and
    selecting said default processing chain if said value output from said look-up table is equal to said second value.

8. The method according to claim 1, further comprising:
deriving said first subsampled chroma component value and said second subsampled chroma component value using said default processing chain, wherein determining whether said default processing chain or said auxiliary processing chain is used comprises determining, based on said minimum color component value, whether said default processing chain is used to derive said luma component value or whether a first auxiliary processing chain is used to derive said luma component value.

9. The method according to claim 1, further comprising:
deriving said luma component value using said default processing chain, wherein determining whether said default processing chain or said auxiliary processing chain is used comprises determining, based on said minimum color component value, whether said default processing chain is used to derive said first subsampled chroma component value and second subsampled chroma component value or whether a second auxiliary processing chain is used to derive said first subsampled chroma component value and said second subsampled chroma component value.

10. The method according to claim 1, wherein determining whether said default processing chain or said auxiliary processing chain is used comprises determining, based on said minimum color component value, whether said default processing chain is used to derive said luma component value, said first subsampled chroma component value and said second subsampled chroma component value or whether a first auxiliary processing chain is used to derive said luma component value and a second auxiliary processing chain is used to derive said first subsampled chroma component value and said second subsampled chroma component value.

11. A device for pre-processing a pixel in a picture to improve a visual quality of the picture, the device comprising:
a processor; and
a memory comprising instructions which, when executed by said processor, cause the processor to:
determine, based on a minimum color component value for said pixel, whether to use a default processing chain to derive a luma component value, a first subsampled chroma component value, and a second subsampled chroma component value or whether to use an auxiliary processing chain to derive at least one of said luma component value, said first subsampled chroma component value, and said second subsampled chroma component value, and
based on the determination, derive one or more of said luma component value, said first subsampled chroma component value, and said second subsampled chroma component value.

12. The device according to claim 11, wherein said device is configured to select said auxiliary processing chain if said minimum color component value is below a threshold value and otherwise selecting said default processing chain.

13. The device according to claim 11, wherein said device is configured to determine, based on said minimum color component value and a maximum color component value for said pixel, whether said default processing chain is used to derive said luma component value, said first subsampled chroma component value and said second subsampled chroma component value or whether said auxiliary processing chain is used to derive said at least one of said luma component value, said first subsampled chroma component value and said second subsampled chroma component value.

14. The device according to claim 13, wherein said device is configured to determine, based on a quotient between said maximum color component value or a weighted version thereof and 1) said minimum color component value or a weighted version thereof, or 2) a sum of said minimum color component value or said weighted version thereof and a constant, whether said default processing chain is used to derive said luma component value, said first subsampled chroma component value and said second subsampled chroma component value or whether said auxiliary processing chain is used to derive said at least one of said luma component value, said first subsampled chroma component value and said second subsampled chroma component value.

15. The device according to claim 14, wherein said device is configured to select said auxiliary processing chain if said quotient exceeds a threshold value and otherwise selecting said default processing chain.

16. The device according to claim 15, wherein
said device is configured to calculate a function value as $$\frac{\max}{\min + s},$$

wherein max represents said maximum color component value or said weighted version thereof, min represents said minimum color component value or said weighted version thereof and s is said constant; and
said device is configured to compare said function value with said threshold value.

17. The device according to claim 14, wherein
said device is configured to input color component values for said pixel in a look-up table configured to output a first value if said quotient exceeds a threshold value and otherwise output a second value;
said device is configured to select said auxiliary processing chain if a value output from said look-up table is equal to said first value; and
said device is configured to select said auxiliary processing chain if said value output from said look-up table is equal to said second value.

18. The device according to claim 11, wherein
said device is configured to derive said first subsampled chroma component value and said second subsampled chroma component value using said default processing chain; and
said device is configured to determine, based on said minimum color component value, whether said default processing chain is used to derive said luma component value or whether a first auxiliary processing chain is used to derive said luma component value.

19. The device according to claim 11, wherein
said device is configured to derive said luma component value using said default processing chain; and
said device is configured to determine, based on said minimum color component value, whether said default processing chain is used to derive said first subsampled chroma component value and said second subsampled chroma component value or whether a second auxiliary processing chain is used to derive said first subsampled chroma component value and said second subsampled chroma component value.

20. The device according to claim 11, wherein said processor is operative to determine, based on said minimum color component value, whether said default processing chain is used to derive said luma component value, said first subsampled chroma component value and said second subsampled chroma component value or whether said auxiliary processing chain is used to derive said at least one of said luma component value, said first subsampled chroma component value and said second subsampled chroma component value.

21. A device for encoding a pixel in a picture, said device comprising:
- a processor; and
- a memory comprising instructions executable by said processor, wherein
- said processor is operative to determine, based on a minimum color component value for said pixel, whether to use a default processing chain to derive a luma component value, a first subsampled chroma component value, and a second subsampled chroma component value or whether to use an auxiliary processing chain to derive at least one of said luma component value, said first subsampled chroma component value, and said second subsampled chroma component value;
- said processor is operative to derive said luma component value, said first subsampled chroma component value, and said second subsampled chroma component value according to said default processing chain or said at least one of said luma component value, said first subsampled chroma component value, and said second subsampled chroma component value according to said auxiliary processing chain; and
- said processor is operative to encode said luma component value, said first subsampled chroma component value, and said second subsampled chroma component value.

22. A device for encoding a pixel in a picture, said device comprising:
- a determining unit for determining, based on a minimum color component value for said pixel, whether to use a default processing chain to derive a luma component value, a first subsampled chroma component value, and a second subsampled chroma component value or whether to use an auxiliary processing chain to derive at least one of said luma component value, said first subsampled chroma component value, and said second subsampled chroma component value;
- a deriver for deriving said luma component value, said first subsampled chroma component value, and said second subsampled chroma component value according to said default processing chain or said at least one of said luma component value, said first subsampled chroma component value, and said second subsampled chroma component value according to said auxiliary processing chain; and
- an encoder for encoding said luma component value, said first subsampled chroma component value, and said second subsampled chroma component value.

* * * * *